US012573020B2

(12) United States Patent
Suenaga

(10) Patent No.: US 12,573,020 B2
(45) Date of Patent: Mar. 10, 2026

(54) THREE-DIMENSIONAL SHAPE DATA GENERATION APPARATUS

(71) Applicant: Keyence Corporation, Osaka (JP)

(72) Inventor: Tsuyoshi Suenaga, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 294 days.

(21) Appl. No.: 18/223,038

(22) Filed: Jul. 18, 2023

(65) Prior Publication Data

US 2024/0112321 A1 Apr. 4, 2024

(30) Foreign Application Priority Data

Sep. 30, 2022 (JP) .................................. 2022-158130

(51) Int. Cl.
*G06T 7/00* (2017.01)
*G06T 7/37* (2017.01)
*G06T 7/521* (2017.01)
*G06T 7/80* (2017.01)

(52) U.S. Cl.
CPC .............. *G06T 7/0006* (2013.01); *G06T 7/37* (2017.01); *G06T 7/521* (2017.01); *G06T 7/80* (2017.01); *G06T 2200/24* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 6,858,826 B2 * | 2/2005 | Mueller | .................... G06T 7/80 |
| | | | 348/E13.016 |
| 10,262,431 B2 | 4/2019 | Tabuchi et al. | |
| 10,323,933 B2 | 6/2019 | Fujiwara et al. | |
| 10,415,958 B2 | 9/2019 | Nakatsukasa | |
| 10,508,902 B2 | 12/2019 | Tabuchi et al. | |

(Continued)

FOREIGN PATENT DOCUMENTS

JP 2018004277 A 1/2018

OTHER PUBLICATIONS

U.S. Appl. No. 18/221,899, filed Jul. 14, 2023 (190 pages).

(Continued)

*Primary Examiner* — Joseph R Haley
(74) *Attorney, Agent, or Firm* — Kilyk & Bowersox, P.L.L.C.

(57) ABSTRACT

To suppress an error between measurements when a plurality of workpieces having the same shape are measured. A three-dimensional shape data generation apparatus includes: a storage unit that stores a plurality of measurement files in which each of measurement conditions of a workpiece and each of alignment images are associated with each other; a display control unit that causes a display unit to display a live image of the workpiece and an alignment image associated with one measurement file from among the plurality of measurement files stored in the storage unit; a reception unit that receives a measurement start instruction of the workpiece; and a measurement control unit that controls a structured illumination unit and an imaging unit based on the measurement condition associated with the one measurement file in response to the measurement start instruction.

14 Claims, 16 Drawing Sheets

(56) References Cited

U.S. PATENT DOCUMENTS

| | | | |
|---|---|---|---|
| 10,739,130 B2 | 8/2020 | Murakami et al. | |
| 2017/0249776 A1* | 8/2017 | Cao ...................... | G06T 17/005 |
| 2019/0128670 A1* | 5/2019 | Chen ................... | G01C 11/025 |

OTHER PUBLICATIONS

U.S. Appl. No. 18/221,900, filed Jul. 14, 2023 (188 pages).
U.S. Appl. No. 18/222,489, filed Jul. 17, 2023 (74 pages).
U.S. Appl. No. 18/222,490, filed Jul. 17, 2023 (123 pages).

* cited by examiner

Figure 13:
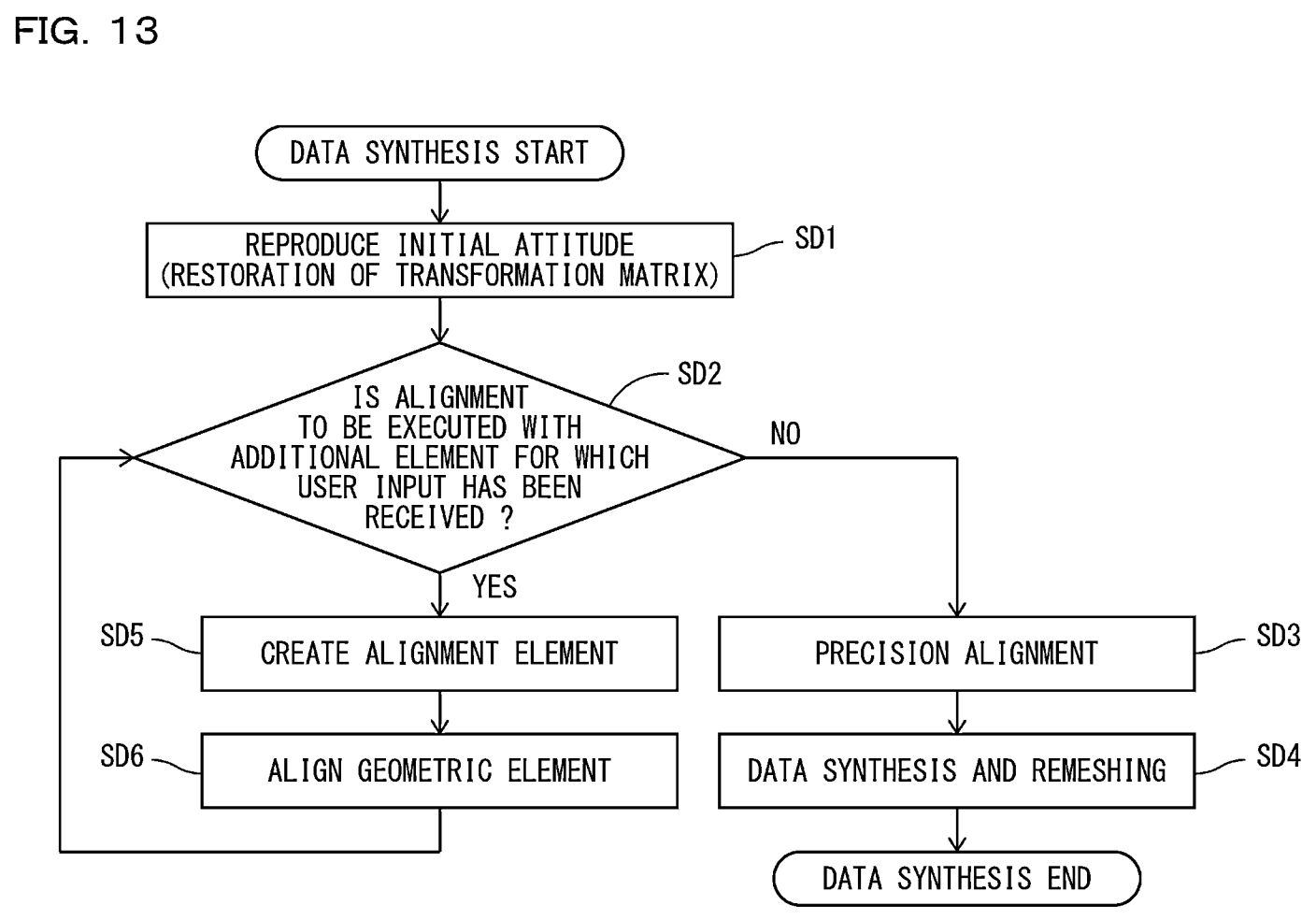

DATA SYNTHESIS START

SD1
REPRODUCE INITIAL ATTITUDE
(RESTORATION OF TRANSFORMATION MATRIX)

SD2
IS ALIGNMENT
TO BE EXECUTED WITH
ADDITIONAL ELEMENT FOR WHICH
USER INPUT HAS BEEN
RECEIVED ?

NO

YES

SD3
PRECISION ALIGNMENT

SD4
DATA SYNTHESIS AND REMESHING

DATA SYNTHESIS END

SD5
CREATE ALIGNMENT ELEMENT

SD6
ALIGN GEOMETRIC ELEMENT

THREE-DIMENSIONAL SHAPE DATA GENERATION APPARATUS

CROSS-REFERENCE TO RELATED APPLICATIONS

The present application claims foreign priority based on Japanese Patent Application No. 2022-158130, filed Sep. 30, 2022, the contents of which are incorporated herein by reference.

BACKGROUND OF THE INVENTION

1. Field of the Invention

The present disclosure relates to a three-dimensional shape data generation apparatus that generates three-dimensional shape data of a workpiece.

2. Description of Related Art

Conventionally, a three-dimensional shape data generation apparatus that generates three-dimensional shape data of a workpiece placed on a stage has been known.

A three-dimensional shape data generation apparatus disclosed in Japanese Patent Application Laid-Open No. 2018-4277 is configured to be capable of irradiating a workpiece placed on a stage with structured light having a predetermined pattern, receiving the structured light reflected from the workpiece by an imaging unit to generate pattern image data of the workpiece, and generating three-dimensional shape data of the workpiece based on the generated pattern image data.

Meanwhile, during the operation of the three-dimensional shape data generation apparatus, for example, in a case where shape data of the entire circumference of a workpiece is measured, it is necessary to place the workpiece in different attitudes and capture images a plurality of times so as to eliminate a blind spot. Thereafter, in a case where it is desired to measure a plurality of workpieces having the same shape, it is necessary to execute a similar measurement procedure for each of the workpieces.

Here, there is a method of imparting an alignment marker to a workpiece in measuring the workpiece. Meanwhile, in a case where measurement of a plurality of workpieces having the same shape is shared by different persons in charge, or in a case where a period has passed since the previous measurement even if the measurement is performed by the same person in charge, it may be difficult to stably obtain measurement results due to fluctuations the number of alignment markers or positions imparted to the workpieces, or a measurement error derived from a measurement principle may easily occur due to different attitudes of the workpieces on the stage.

There is also a case where no alignment marker is used in measuring a workpiece. In this case, however, rework due to a wrong attitude during the measurement of the workpiece may easily occur, and a measurement error derived from a measurement principle may easily occur due to different attitudes on the stage similarly to the case of using the alignment marker.

Further, in a case where one piece of three-dimensional shape data is created by synthesizing a plurality of pieces of image data obtained by performing measurement a plurality of times while changing an attitude of a workpiece, alignment between pieces of image data having different attitudes is required, but it is difficult to perform similar alignment for each of the plurality of workpieces. Furthermore, in a case where an image of a workpiece is captured from an oblique direction, it is necessary to determine all six degrees of freedom in order to adjust a relative positional relationship between the workpiece and an imaging unit, and it is extremely difficult to make this determination for the plurality of workpieces one by one.

SUMMARY OF THE INVENTION

The present disclosure has been made in view of such a point, and is aimed at suppressing an error between measurements when a plurality of workpieces having the same shape are measured.

In order to achieve the above aim, according to one embodiment, it is possible to assume a three-dimensional shape data generation apparatus including an imaging unit, which has an angle of view to receive structured light emitted by a structured illumination unit and reflected by a workpiece and generate pattern image data of the workpiece, and generating three-dimensional shape data of the workpiece based on the pattern image data generated by the imaging unit. The three-dimensional shape data generation apparatus can store, in a storage unit, a plurality of measurement files in which each of measurement conditions of the workpiece is associated with each of alignment images for aligning a workpiece before being captured by the imaging unit at a predetermined position. It is possible to cause a display unit to display a live image of the workpiece and the alignment image associated with one measurement file from among the plurality of measurement files stored in the storage unit and to receive a measurement start instruction of the workpiece, and it is possible to control the structured illumination unit and the imaging unit based on the measurement condition associated with the one measurement file in response to the received measurement start instruction.

According to this configuration, for example, the measurement file in which the measurement condition of the workpiece applied when the measurement was performed in the past and the alignment image of the workpiece acquired when the measurement was performed in the past are associated with each other can be stored in the storage unit. Therefore, when a workpiece having the same shape as the workpiece measured in the past is measured, the alignment image and the live image of the workpiece to be measured can be displayed on the display unit by reading the measurement file. As a result, a user can accurately place the workpiece to be measured at a predetermined position while viewing the display unit, and thus, a measurement error is less likely to occur. Further, an incorrect attitude of the workpiece to be measured is less likely to occur, and thus, the occurrence of rework can also be suppressed. Note that the same shape does not need to be exactly the same, and for example, a slight difference in shape caused by a manufacturing error or shapes different within a tolerance range are also included in the same shape.

Further, the reception unit may be capable of receiving a setting of a measurement condition of a master workpiece and a measurement start instruction. In this case, the imaging unit can generate an alignment image in response to the measurement start instruction received by the reception unit, and the storage unit can store a measurement file in which the measurement condition received by the reception unit is associated with the alignment image generated by the imaging unit. As a result, measurement of the master workpiece and measurement of the workpiece different from the master workpiece are performed by the same three-dimensional shape data generation apparatus, and thus, the same measurement state can be reproduced and an error between the measurements can be further suppressed.

Further, the display control unit can cause the display unit to display an alignment image associated with a first measurement file and the live image of the workpiece. In this case, the reception unit receives a first measurement start instruction of the workpiece, and the measurement control unit specifies a measurement condition associated with the first measurement file in response to the first measurement start instruction of the workpiece, and controls the structured illumination unit and the imaging unit based on the specified measurement condition. The three-dimensional shape data generation unit controls the structured illumination unit and the imaging unit based on the measurement condition specified by the measurement control unit, and generates first three-dimensional shape data of the workpiece based on the pattern image data generated by the imaging unit.

Further, the display control unit can cause the display unit to display an alignment image associated with the second measurement file and the live image of the workpiece. In this case, the reception unit receives a second measurement start instruction of the workpiece, and the measurement control unit specifies a measurement condition associated with the second measurement file in response to the second measurement start instruction of the workpiece, and controls the structured illumination unit and the imaging unit based on the specified measurement condition. The three-dimensional shape data generation unit controls the structured illumination unit and the imaging unit based on the measurement condition specified by the measurement control unit, and generates second three-dimensional shape data of the workpiece based on the pattern image data generated by the imaging unit. The first three-dimensional shape data of the workpiece and the second three-dimensional shape data of the workpiece are synthesized based on alignment information, so that synthetic three-dimensional shape data of the workpiece can be generated.

That is, misalignment of the workpiece with respect to the master workpiece can be suppressed based on the alignment image, and the first three-dimensional shape data of the workpiece and the second three-dimensional shape data of the workpiece can be aligned using the alignment information of the master workpiece. Thus, it is unnecessary to perform an alignment setting for each measurement, and a measurement result with higher identity can be reproduced.

As described above, according to the three-dimensional shape data generation apparatus of the disclosure, the alignment image acquired in the past measurement and the live image of the workpiece to be measured are displayed on the display unit, so that the user can accurately place the workpiece at the predetermined position, and thus, it is possible to suppress the error between the measurements in the case of measuring a plurality of workpieces having the same shape.

BRIEF DESCRIPTION OF THE DRAWINGS

FIG. 13 is a flowchart illustrating an example of a procedure of data synthesis processing in the measurement reproduction;

DETAILED DESCRIPTION OF PREFERRED EMBODIMENTS

Hereinafter, embodiments of the present invention will be described in detail with reference to the drawings. Note that the following preferred embodiments are described merely as examples in essence, and there is no intention to limit the present invention, its application, or its use.

First Embodiment

Figure 1:
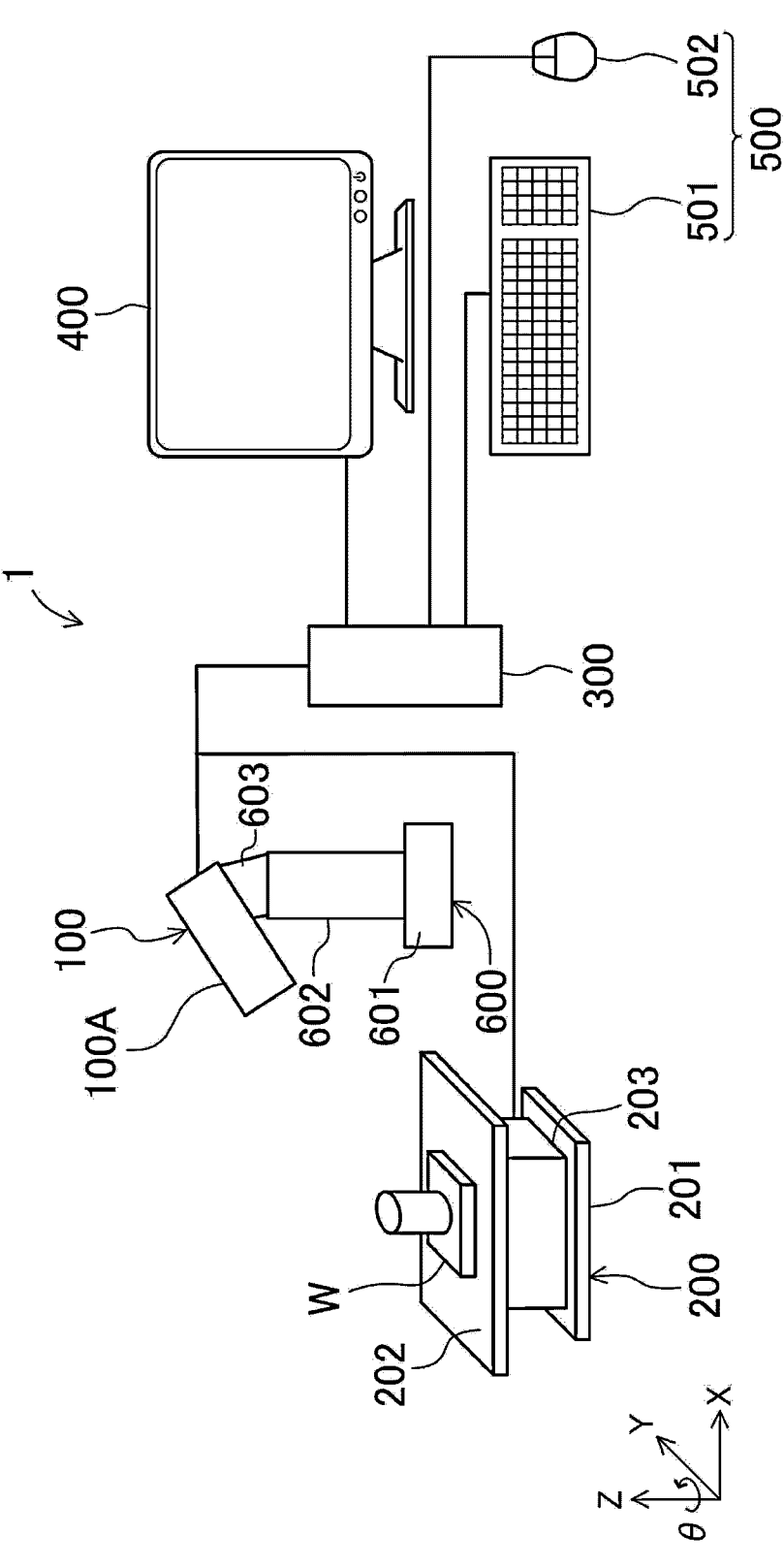
FIG. 1 is a diagram illustrating an overall configuration of a three-dimensional shape data generation apparatus according to a first embodiment of the invention.

FIG. 1 is a diagram illustrating an overall configuration of a three-dimensional shape data generation apparatus 1 according to a first embodiment of the invention. The three-dimensional shape data generation apparatus 1 is a system that generates three-dimensional shape data of a workpiece (measurement target object) W, and can convert mesh data of the workpiece W acquired by measuring a shape of the workpiece W into CAD data and output the CAD data, for example.

Although not particularly limited, the three-dimensional shape data generation apparatus 1 is used, for example, in a case where CAD data of an existing product is acquired to perform next-generation model development and shape analysis on CAD and/or CAE, a case where a shape of a model or a mock-up in a product design is reflected in the product design, a case where a product to be an engagement source is designed based on a shape of a mating component to be engaged, a case where an improved design is made based on a shape of a prototype, or the like. Therefore, examples of the workpiece W can include an existing product, a model, a mock-up, and a prototype.

Further, the three-dimensional shape data generation apparatus 1 can also convert the mesh data of the workpiece W into surface data and output the surface data. Since a reverse engineering process and reverse engineering work of a user can be supported by converting the mesh data of the workpiece W into the surface data and outputting the surface data, the three-dimensional shape data generation apparatus 1 can also be referred to as a reverse engineering support apparatus.

In the following description, when a shape of the workpiece W is measured, the workpiece W is irradiated with structured light for measurement having a predetermined pattern, and coordinate information is acquired based on the structured light reflected by the surface of the workpiece W in acquiring the coordinate information of a surface of the workpiece W. For example, it is possible to apply a measuring method by triangulation using a fringe projection image obtained from the structured light reflected by the surface of the workpiece W. In the invention, however, the principle and configurations for acquiring the coordinate information of the workpiece W are not limited thereto, and other methods can also be applied.

The three-dimensional shape data generation apparatus 1 includes a measurement unit 100, a pedestal 200, a controller 300, a display unit 400, and an operation unit 500. The measurement unit 100 and the controller 300 may be connected by a communication cable or the like, or may be connected by wireless connection.

Figure 2:
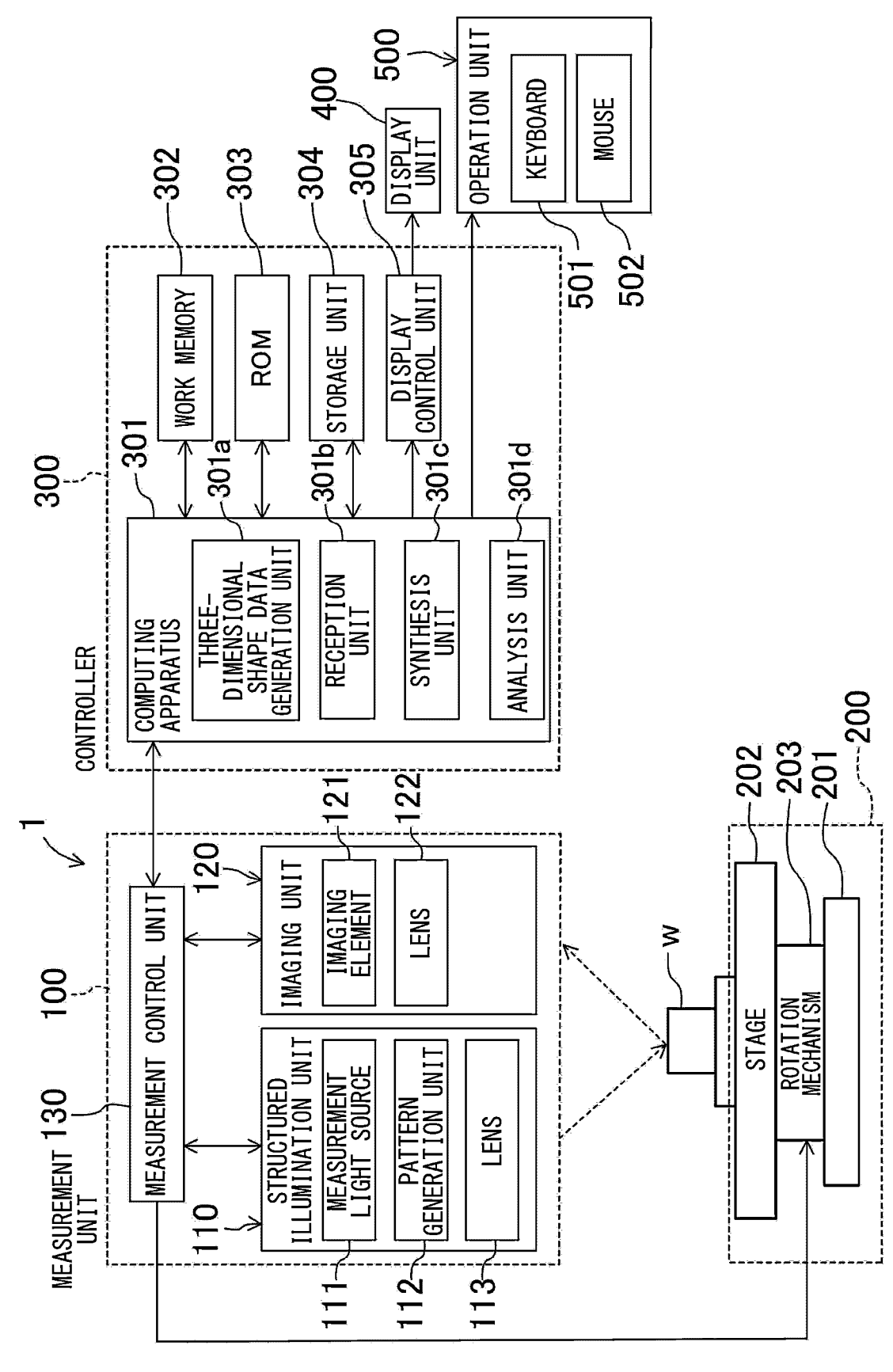
FIG. 2 is a block diagram of the three-dimensional shape data generation apparatus.

As illustrated in FIG. 2, the measurement unit 100 includes a structured illumination unit 110 and an imaging unit 120, and includes a housing 100A to which the structured illumination unit 110 and the imaging unit 120 are attached. Furthermore, the measurement unit 100 also includes a measurement control unit 130 that controls the structured illumination unit 110 and the imaging unit 120. The measurement control unit 130 may be provided in the housing 100A or may be provided on the controller 300 side.

The housing 100A is provided separately from the controller 300 and supported by a support unit 600. The support unit 600 is portable and includes a base portion 601, an expansion/contraction portion 602 fixed to the base portion 601, and an angle adjustment portion 603 provided on the top of the expansion/contraction portion 602, and an installation position thereof can be freely set by a user. The measurement unit 100 is detachably attached to the angle adjustment portion 603. A height of the measurement unit 100 can be adjusted by expanding and contracting the expansion/contraction portion 602 in the vertical direction. Further, the angle adjustment portion 603 is configured to be capable of adjusting, for example, rotation about a horizontal axis, rotation about a vertical axis, rotation about an inclination axis, and the like. As a result, an installation angle of the measurement unit 100 with respect to the horizontal plane and an installation angle with respect to the vertical plane can be freely adjusted.

The support unit 600 is not limited to the above-described configuration, and may be configured using, for example, a tripod, a flexible arm that can be freely bent and can maintain a bent shape, a bracket, or the like, or a combination thereof. Further, the measurement unit 100 can also be used by being attached to, for example, a six-degree-of-freedom arm of an industrial robot. Furthermore, the measurement unit 100 can be used by being held by the user's hand, and in this case, the support unit 600 is unnecessary. That is, the support unit 600 may be a member included in a part of the three-dimensional shape data generation apparatus 1 or may be a member not included in the three-dimensional shape data generation apparatus 1.

When the user measures the workpiece W holding the housing 100A, the measurement can be performed by bringing the measurement unit 100 to a manufacturing site of the workpiece W or the like. In this case, the user can measure a shape of the workpiece W by moving the measurement unit 100 to any position and capturing an image at any timing. This can be referred to as manual measurement.

Further, when the measurement unit 100 is supported by the support unit 600 and the workpiece W is placed on the pedestal 200 of an automatic rotation type, which will be described later, it is possible to measure a shape of the workpiece W in a wide range by capturing images of the workpiece W at predetermined timings while rotating the workpiece W by the pedestal 200. This can be referred to as semi-automatic measurement. Note that the measurement can be performed by placing the workpiece W on, for example, a surface plate or the like without placing the workpiece W on the pedestal 200.

Further, when the measurement unit 100 is attached to the arm of the industrial robot and moved, a shape of the workpiece W in a wide range can be measured without the intervention of the user's hand. This can be referred to as fully automatic measurement. The present invention is applicable to all of the manual measurement, the semi-automatic measurement, and the fully automatic measurement.

As illustrated in FIG. 2, the measurement unit 100 includes the structured illumination unit 110 that irradiates the workpiece W with structured light for measurement, and the imaging unit 120 having an angle of view that receives the structured light emitted by the structured illumination unit 110 and reflected by the workpiece W and generates pattern image data of the workpiece W. The measurement unit 100 may include a plurality of the structured illumination units 110. For example, a first structured illumination unit capable of irradiating the workpiece W with first structured light from a first direction and a second structured illumination unit capable of irradiating the workpiece W with second structured light from a second direction different from the first direction may be provided. Further, the measurement unit 100 may include a plurality of the imaging units 120.

Although not illustrated, it is also possible to project structured light to the workpiece W in different irradiation directions by providing three or more structured illumination units 110 or relatively moving the structured illumination unit 110 and the pedestal 200 while using the common structured illumination unit 110. Further, a configuration in which a plurality of the imaging units 120 are prepared to receive light for the common structured illumination unit 110 may be adopted, in addition to a configuration in which a plurality of the structured illumination units 110 are prepared and light is received by the common imaging unit 120. Furthermore, an irradiation angle of the structured light, projected by the structured illumination unit 110, relative to the Z direction may be fixed or variable.

The structured illumination unit 110 includes a measurement light source 111, a pattern generation unit 112, and a plurality of lenses 113. As the measurement light source 111, a light source that emits monochromatic light, for example, a halogen lamp that emits white light, a blue light emitting diode (LED) that emits blue light, an organic EL, or the like can be used. The light emitted from the measurement light source 111 is collected, and then incident on the pattern generation unit 112.

The pattern generation unit 112 reflects the light that has been emitted from the measurement light source 111 so as to irradiate the workpiece W with the structured light. The measurement light incident on the pattern generation unit 112 is converted into a preset pattern with a preset intensity (brightness) and emitted. The structured light emitted by the pattern generation unit 112 is converted into light having a diameter larger than an observable/measurable field of view of the imaging unit 120 by the plurality of lenses 113, and then emitted to the workpiece W.

The pattern generation unit 112 is a member that can be switched between an irradiation state in which the workpiece W is irradiated with the structured light and a non-irradiation state in which the workpiece W is not irradiated with the structured light. Such a pattern generation unit 112 can be configured using, for example, a digital micromirror device (DMD) or the like. The pattern generation unit 112 using the DMD can be controlled by the measurement control unit 130 to be switchable between a reflection state in which the structured light is reflected on an optical path as the irradiation state and a light shielding state in which the structured light is shielded as the non-irradiation state.

The DMD is an element in which a large number of micromirrors (micro mirror surfaces) are arrayed on a plane. Each of the micromirrors can be individually switched between an ON state and an OFF state by the measurement control unit 130, and thus, light having a desired projection pattern can be generated as the structured light for measurement by combining the ON states and the OFF states of the large number of micromirrors. As a result, it is possible to generate a pattern necessary for triangulation and measure a shape of the workpiece W. In this manner, the DMD functions as a part of an optical system that irradiates the workpiece W with a periodic projection pattern for measurement during measurement. Further, the DMD is also excellent in response speed, and has an advantage of being operable at a higher speed than a shutter or the like.

Note that the example in which the DMD is used for the pattern generation unit 112 has been described in the above example, but the pattern generation unit 112 is not limited to the DMD, and other members can also be used in the invention. For example, a liquid crystal on silicon (LCOS) may be used as the pattern generation unit 112. Alternatively, a transmission amount of structured light may be adjusted using a transmissive member instead of a reflective member. In this case, the pattern generation unit 112 is disposed on the optical path to switch between the irradiation state in which light is transmitted and the light shielding state in which light is shielded. Such a pattern generation unit 112 can be configured using a liquid crystal display (LCD). Alternatively, the pattern generation unit 112 may be configured by a projection method using a plurality of line LEDs, a projection method using a plurality of optical paths, an optical scanner method including a laser and a galvanometer mirror, an accordion fringe interferometry (AFI) method using interference fringes generated by superimposing beams divided by a beam splitter, a projection method using gratings formed with a piezo stage, an encoder with high resolving power, and the like and a movement mechanism, or the like. Note that the pattern generation unit 112 can also emit uniform light without generating a pattern.

The imaging unit 120 includes an imaging element 121 and a plurality of lenses 122. The structured light reflected by the workpiece W is incident on the lens 122, collected, and formed as an image, and then received by the imaging element 121. The imaging unit 120 may include a high-magnification imaging unit including the high-magnification lens 122 and a low-magnification imaging unit including the low-magnification lens 122. Further, the lens 122 may be a zoom lens or the like capable of changing the magnification, or may be the imaging unit 120 capable of changing the magnification. The magnification at the time of imaging and image data are associated with each other, and it is possible to identify at which magnification the image data has been captured.

The imaging element 121 includes, for example, an image sensor such as a charge-coupled device (CCD) or a complementary metal oxide semiconductor (CMOS). An analog electric signal (hereinafter, referred to as a "light reception signal") corresponding to the amount of received light is output from each pixel of the imaging element 121 to an A/D converter which will be described later. A color imaging element needs to include pixels respectively corresponding to light reception for red, green, and blue, and thus, has lower measurement resolving power as compared with a monochromatic imaging element, and has lower sensitivity because each of the pixels is necessarily provided with a color filter. Therefore, a monochromatic CCD is adopted as the imaging element 121 in the embodiment. Note that a color imaging element may be used as the imaging element 121.

An analog/digital converter (A/D converter), a first-in first-out (FIFO) memory (not illustrated), a CPU, and the like (not illustrated) are on the imaging unit 120. The light reception signals output from the imaging element 121 are sampled at a constant sampling period by the A/D converter and converted into digital signals. The digital signals output from the A/D converter are sequentially accumulated in the FIFO memory. The digital signals accumulated in the FIFO memory are sequentially output as pixel data to the CPU, and the CPU generates pattern image data.

For example, pattern image data representing a three-dimensional shape of the workpiece W included in a field of view of the imaging element 121 at a specific position is generated based on the light reception signals output from the imaging element 121. The pattern image data is an image itself acquired by the imaging element 121, and the pattern image data includes a plurality of images, for example, when a shape of the workpiece W is measured by a phase shift method. Note that the pattern image data may be point cloud data that is a set of points having three-dimensional position information, and the pattern image data of the workpiece W can be acquired from the point cloud data. The point cloud data is data expressed by an aggregate of a plurality of points having three-dimensional coordinates. The generated pattern image data is transferred to the controller 300.

Further, when the structured illumination unit 110 does not emits the structured illumination but emits uniform light, the imaging unit 120 captures an image of the workpiece W irradiated with the uniform light. At this time, the imaging unit 120 can capture a live image. The live image is an image that is updated at a predetermined short frame rate (fps) as needed, and is visually recognized as a moving image by the user.

The operation unit 500 can include, for example, a pointing device such as a keyboard 501 or a mouse 502. As the pointing device, for example, a joystick or the like may be used. Further, the operation unit 500 may include a touch panel or the like that senses a touch operation by the user. The operation unit 500 and a computing apparatus 301 in the controller 300 are connected, and which operation has been performed by the operation unit 500 can be detected by the computing apparatus 301.

The pedestal 200 includes a base plate 201, a stage 202 forming a placement surface on which the workpiece W is placed, and a rotation mechanism 203. The pedestal 200 may include a clamp mechanism that clamps the workpiece W on the stage 202. The rotation mechanism 203 is a mechanism that is provided between the base plate 201 and the stage 202 and rotates the stage 202 about a vertical axis (Z axis illustrated in FIG. 1) with respect to the base plate 201. Therefore, the stage 202 is a rotation stage, and it is possible to switch a relative positional relationship of the workpiece W with respect to the imaging unit 120 by rotating the stage in a state where the workpiece W is placed. A direction of rotation about the Z axis is defined as a θ direction, and is indicated by an arrow θ. Further, the pedestal 200 may include a tilt stage having a mechanism rotatable about an axis parallel to the placement surface.

The rotation mechanism 203 includes a motor and the like controlled by a measurement control unit 130, which will be described later, and can hold the stage 202 in a stopped state after rotating the stage by a desired rotation angle. The pedestal 200 is not an essential component of the invention, and is provided as necessary. Further, the pedestal 200 may be controlled by the controller 300.

Although not illustrated, the pedestal 200 may include a translation mechanism that moves the stage 202 horizontally in an X direction and a Y direction orthogonal to each other. The translation mechanism also includes a motor and the like controlled by the measurement control unit 130 and the controller 300, and can hold the stage 202 in a stopped state after moving the stage in the X direction and the Y direction by a desired movement amount. Note that the present invention is also applicable to a case where the stage 202 is a fixed stage.

The controller 300 includes the computing apparatus 301, a work memory 302, a read only memory (ROM) 303, a storage unit 304, a display control unit 305, and the like. The controller 300 can be configured using a personal computer (PC) or the like, and may be configured using only a dedicated computer or a combination of the PC and the dedicated computer.

The ROM 303 of the controller 300 stores, for example, a system program and the like. The work memory 302 of the controller 300 includes, for example, a random access memory (RAM) and is used for processing of various types of data. The storage unit 304 includes, for example, a solid state drive, a hard disk drive, or the like. The storage unit 304 stores a three-dimensional shape data generation program. Further, the storage unit 304 is used to save various types of data such as pixel data (pattern image data), setting information, measurement conditions of the workpiece W, and an alignment image given from the measurement control unit 130. Examples of the measurement conditions include settings of the structured illumination unit 110 (a pattern frequency and a pattern type), a magnification of the imaging unit 120, a measurement field of view (single field of view or wide field of view), a measurement position, a rotation attitude, exposure conditions (exposure time, gain, and illumination brightness), resolution settings setting (low-resolution measurement, standard measurement, or high-resolution measurement), and the like.

The alignment image is an image for aligning the workpiece W before being captured by the imaging unit 120 at a predetermined position. A file in which the measurement conditions of the workpiece W are associated with the alignment image is a measurement file. The storage unit 304 can also store a plurality of the measurement files.

The display control unit 305 is a part that controls the display unit 400, and causes the display unit 400 to display the alignment image associated with one measurement file and a live image of the workpiece W from among the plurality of measurement files stored in the storage unit 304. The live image of the workpiece W is a live image obtained by irradiating the workpiece W currently placed on the stage 202 of the pedestal 200 with uniform light and capturing an image of the workpiece W irradiated with the uniform light by the imaging unit 120.

The computing apparatus 301 is configured using a control circuit or a control element that processes a given signal or data, performs various computations, and outputs computation results. In the specification, a computing apparatus 301 means an element or a circuit that performs computations, and is not limited to a processor, such as a CPU for general-purpose PC, an MPU, a GPU or a TPU regardless of its name, but used in the sense of including a processor or a microcomputer such as a FPGA, an ASIC, and an LSI, or a chip set such as an SoC.

The computing apparatus 301 performs various processes on the pattern image data generated by the imaging unit 120 using the work memory 302. The computing apparatus 301 forms a three-dimensional shape data generation unit 301a, a reception unit 301b, a synthesis unit 301c, and the like. The three-dimensional shape data generation unit 301a, the reception unit 301b, and the synthesis unit 301c may be configured only by hardware of the computing apparatus 301, or may be configured by a combination of hardware and software. For example, when the computing apparatus 301 executes the three-dimensional shape data generation program, functions of the three-dimensional shape data generation unit 301a, the reception unit 301b, and the synthesis unit 301c can be implemented.

Details of the three-dimensional shape data generation unit 301a, the reception unit 301b, and the synthesis unit 301c will be described later, but will be briefly described here. The three-dimensional shape data generation unit 301a is a part that generates three-dimensional shape data of the workpiece W based on the pattern image data generated by the imaging unit 120.

The reception unit 301b is a part that receives a measurement start instruction of the workpiece W. For example, in a case where a user interface provided with a measurement start button is displayed on the display unit 400 and the operation for the measurement start button by the user is detected, the reception unit 301b receives the measurement start instruction of the workpiece W. The reception unit 301b can also receive a plurality of measurement start instructions.

The synthesis unit 301c is a part that generates synthetic three-dimensional shape data of the workpiece W by synthesizing a plurality of pieces of three-dimensional shape data based on alignment information.

The measurement control unit 130 is connected to the controller 300 and is controlled by the computing apparatus 301 of the controller 300. The measurement start instruction received by the reception unit 301b is output to the measurement control unit 130. When the measurement start instruction received by the reception unit 301b is input, the measurement control unit 130 controls the structured illumination unit 110 and the imaging unit 120 based on the measurement conditions associated with one measurement file according to the measurement start instruction.

The display unit 400 includes, for example, a liquid crystal display, an organic EL display, or the like. The display unit 400 is connected to the display control unit 305 of the controller 300 and is controlled by the display control unit 305. The display unit 400 displays, for example, an image captured by the imaging unit 120, various user interface screens, a setting screen, an input screen, an image based on the three-dimensional shape data of the workpiece W, and the like.

Figure 3:
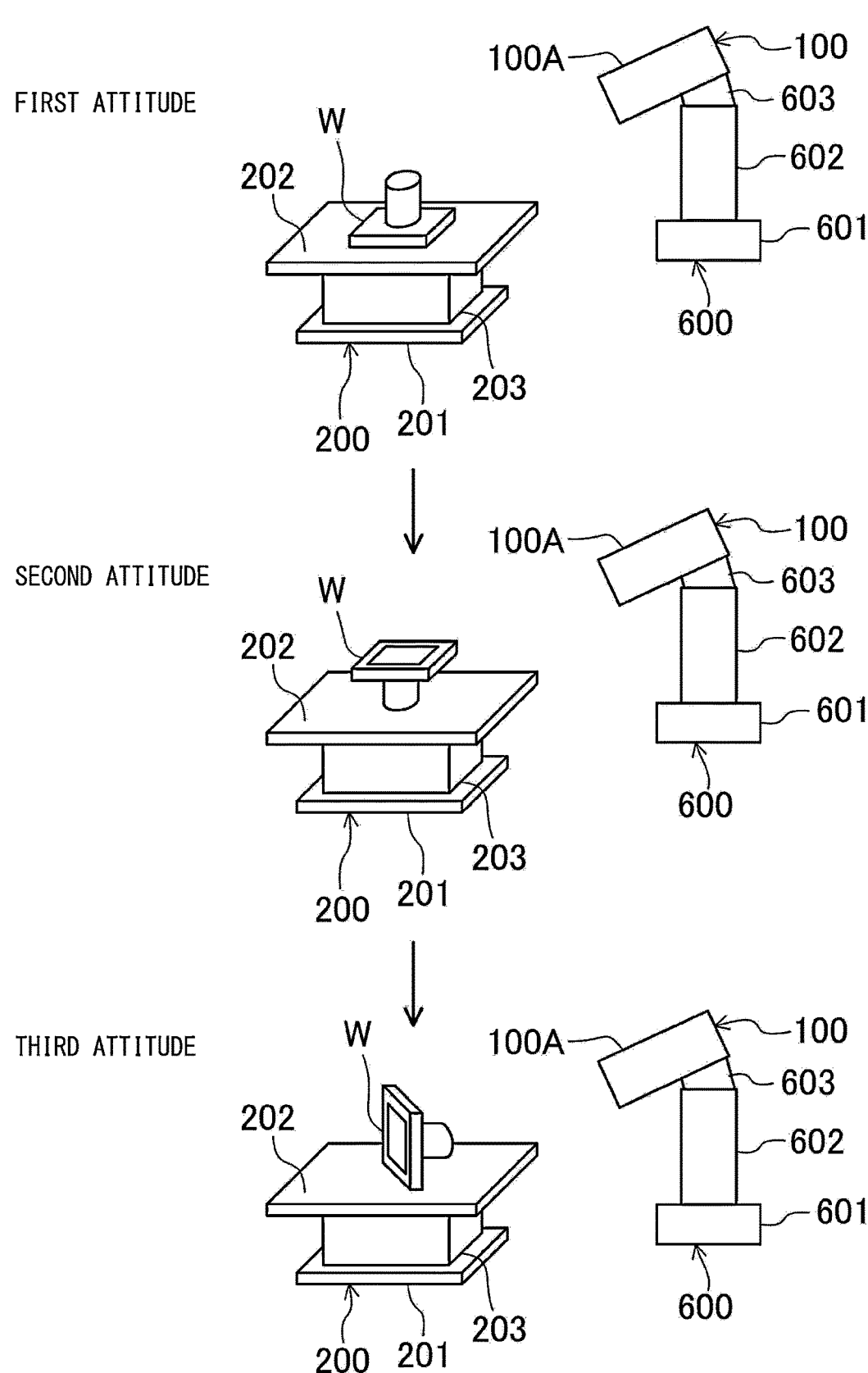
FIG. 3 is a view illustrating a state in which a workpiece is placed again in different attitudes to capture images.

Hereinafter, details of the three-dimensional shape data generation apparatus 1 will be described with reference to flowcharts, user interface screens, and the like. During operation of the three-dimensional shape data generation apparatus 1, for example, there is a case where it is desired to measure shape data of the entire circumference of the workpiece W. In this case, first, in initial measurement, it is necessary to place the workpiece W again in a different attitude so as to eliminate a blind spot as illustrated in FIG. 3 and capture images a plurality of times by the imaging unit 120. Thereafter, when it is desired to measure a plurality of the workpieces W having the same shape, it is necessary to execute a similar measurement procedure for each of the workpieces W, and it is possible to align a workpiece to be measured at a predetermined position while referring to the alignment image on the display unit 400 by using the three-dimensional shape data generation apparatus 1.

(In Initial Measurement)

First, an example of a procedure of initial measurement processing will be described with reference to FIG. 4. In Step SA1 of a flowchart illustrated in FIG. 4, three-dimensional shape data of a workpiece to be measured for the first time is acquired. Here, mesh data is acquired as the three-dimensional shape data. The workpiece W to be measured for the first time is also referred to as a master workpiece, and is distinguished from a workpiece to be measured during the operation after then.

Specifically, the imaging unit 120 captures an image of the master workpiece W in a state where the master workpiece W is irradiated by the structured illumination unit 110 to generate pattern image data of the master workpiece W, and then, the three-dimensional shape data generation unit 301a generates three-dimensional shape data of the master workpiece W based on the pattern image data generated by the imaging unit 120. The mesh data as the three-dimensional shape data generated here includes a plurality of polygons and can also be referred to as polygon data. The polygon is data including information specifying a plurality of points and information indicating a polygonal surface formed by connecting the points, and can include, for example, information specifying three points and information indicating a triangular surface formed by connecting the three points. The mesh data and the polygon data can also be defined as data represented by aggregates of a plurality of polygons.

Figure 5:
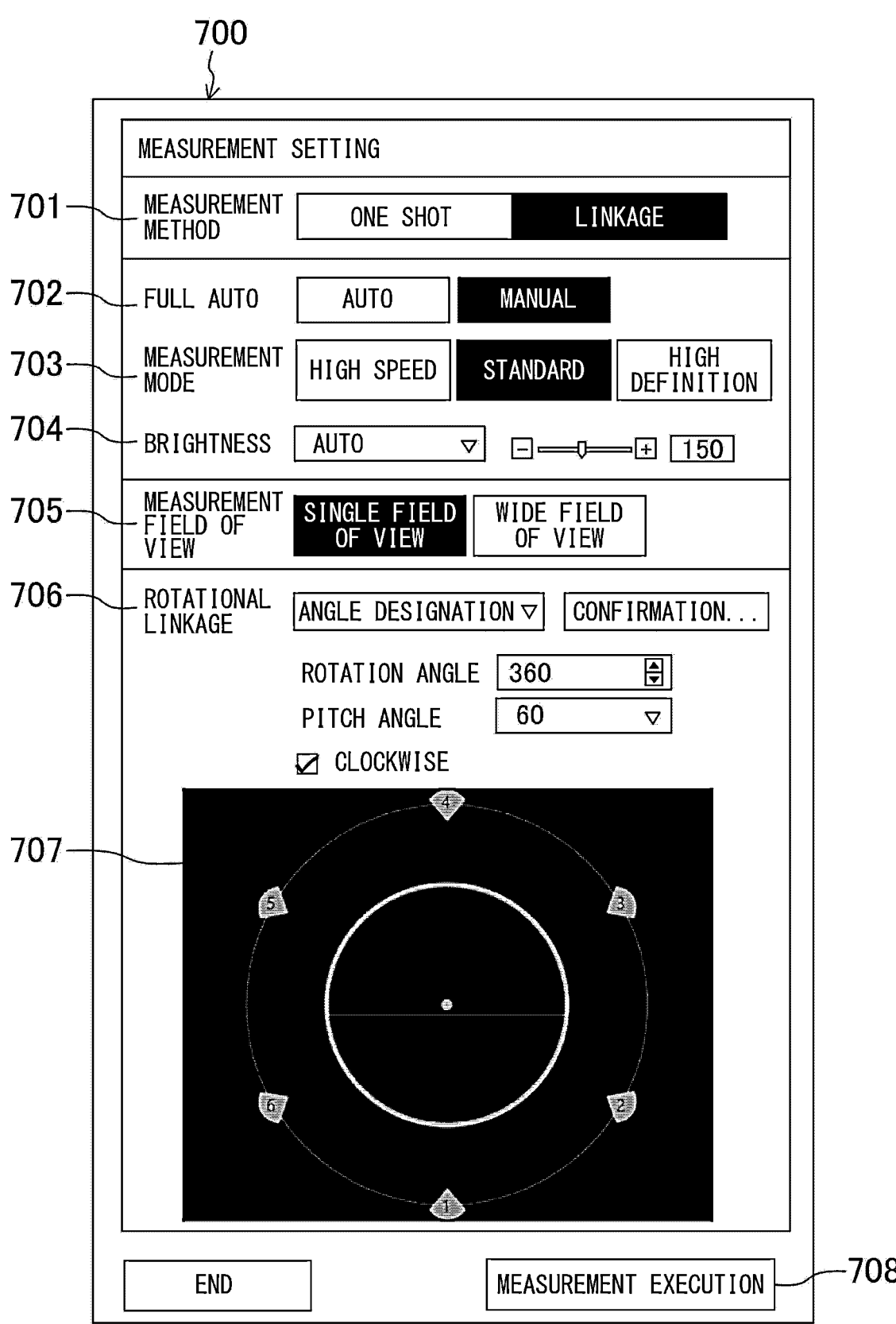
FIG. 5 is a view illustrating an example of a measurement setting user interface screen.

FIG. 5 illustrates a measurement setting user interface screen 700 displayed on the display unit 400 by the display control unit 305 when measuring the master workpiece W. The measurement setting user interface screen 700 is provided with a measurement method selection area 701, a full auto selection area 702, a measurement mode selection area 703, a brightness setting area 704, a measurement field of view selection area 705, a rotational linkage setting area 706, and a schematic view display area 707.

In the measurement method selection area 701, one of "one shot" in which the number of times of capturing is only one and "linkage" in which the master workpiece W is captured a plurality of times in different attitudes and captured images are linked can be selected. In the full auto selection area 702, it is possible to select one of "auto" requiring no user operation during execution of measurement and "manual" requiring a user operation. In the measurement mode selection area 703, one of "high speed" enabling high-speed measurement, "standard" enabling measurement at standard speed, and "high definition" enabling high-definition measurement can be selected. In the brightness setting area 704, brightness of an image acquired by the imaging unit 120 can be set, and the user can manually set the brightness in addition to "auto" in which the three-dimensional shape data generation apparatus 1 automatically sets the brightness. Since the brightness of the image acquired by the imaging unit 120 is related to an exposure time of the imaging unit 120, the reception unit 301b can receive a setting of the exposure time of the imaging unit 120 as a measurement condition. Further, in the measurement field of view selection area 705, one of a relatively narrow "single field of view" and a relatively wide "wide field of view" can be selected. Further, in the embodiment, a plurality of types of projection patterns of structured light emitted from the structured illumination unit 110 are provided, and the user can select one projection pattern from among the plurality of types of projection patterns. That is, the reception unit 301b can also receive a setting of the projection pattern of the structured light emitted from the structured illumination unit 110 as a measurement condition.

In the rotational linkage setting area 706, an operation setting of the rotation mechanism 203 of the pedestal 200 can be performed, and a rotation angle, a pitch angle, and a rotation direction (clockwise or counterclockwise) of the stage 202 by the rotation mechanism 203 can be set. For example, when the rotation angle is set to 360 degrees and the pitch angle is set to 60 degrees, the stage 202 repeats an operation of rotating by 60 degrees and then stopping six times to make one cycle. As the stage 202 is rotated at a predetermined pitch angle in this manner, the relative positional relationship of the workpiece W with respect to the imaging unit 120 can be switched, and a relative imaging angle of the workpiece W with respect to the imaging unit 120 can also be switched. The imaging angle is determined as the user operates the operation unit 500 to designate the rotation angle of the stage 202. That is, the reception unit 301b can receive the designation of the relative imaging angle of the workpiece W with respect to the imaging unit 120.

While the stage 202 is stopped, illumination by the structured illumination unit 110 and imaging by the imaging unit 120 are executed. In the schematic view display area 707, a schematic view of the placement surface of the stage 202 is displayed, and for example, a mark of a stop position according to a pitch angle can also be displayed.

The measurement conditions set in the respective areas 701 to 707 of the measurement setting user interface screen 700 in the initial measurement are the measurement conditions of the master workpiece. The measurement conditions set in the respective areas 701 to 707 of the measurement setting user interface screen 700 are received by the reception unit 301b. Further, the measurement setting user interface screen 700 is provided with a measurement execution button 708. When the user operates the measurement execution button 708, the operation is received by the reception unit 301b as the measurement start instruction of the master workpiece.

In Step SA1, a plurality of sequences can be executed. The sequence is a series of measurement processing that can be executed only by the three-dimensional shape data generation apparatus 1 without the user operation. Referring to FIG. 3 as an example, the user places the master workpiece W on the stage 202 in a first attitude, thereafter sets measurement conditions in the respective areas 701 to 707 of the measurement setting user interface screen 700, and then operates the measurement execution button 708. Then, the three-dimensional shape data generation apparatus 1 executes a first sequence. A setting of the measurement conditions before the execution of the first sequence is a setting of a first measurement condition. A measurement start instruction received by the reception unit 301*b* before the execution of the first sequence is a first measurement start instruction.

In the first sequence, the measurement control unit 130 controls the structured illumination unit 110 and the imaging unit 120 based on the first measurement condition. In response to the first measurement start instruction received by the reception unit 301*b*, the imaging unit 120 generates a first alignment image and receives structured light reflected by the master workpiece W to generate pattern image data. Thereafter, the three-dimensional shape data generation unit 301*a* generates first three-dimensional shape data (point cloud data or mesh data) of the master workpiece W based on the pattern image data generated by the imaging unit 120.

At this time, if "linkage" is selected in the measurement method selection area 701, the measurement control unit 130 controls the rotation mechanism 203 of the pedestal 200 based on the setting of the rotational linkage setting area 706, and the measurement control unit 130 executes illumination by the structured illumination unit 110 and imaging by the imaging unit 120 every time the stage 202 stops.

The measurement conditions include a setting of a projection pattern of structured light, a setting of an exposure time of the imaging unit 120, a setting of a relative imaging angle of the master workpiece W with respect to the imaging unit 120, and the like. When a setting of an imaging angle has been received by the reception unit 301*b*, the measurement control unit 130 drives the stage 202 based on the imaging angle received by the reception unit 301*b* to dispose the master workpiece W to form the imaging angle.

When the first sequence ends, the user places the master workpiece W in a second attitude illustrated in FIG. 3 on the stage 202, thereafter sets measurement conditions in the respective areas 701 to 707 of the measurement setting user interface screen 700, and then operates the measurement execution button 708. Then, the three-dimensional shape data generation apparatus 1 executes a second sequence. A setting of the measurement conditions before the execution of the second sequence is a setting of a second measurement condition. A measurement start instruction received by the reception unit 301*b* before the execution of the second sequence is a second measurement start instruction.

In the second sequence, the measurement control unit 130 controls the structured illumination unit 110 and the imaging unit 120 based on the second measurement condition. In response to the second measurement start instruction received by the reception unit 301*b*, the imaging unit 120 generates a second alignment image and receives structured light reflected by the master workpiece W to generate pattern image data. Thereafter, the three-dimensional shape data generation unit 301*a* generates second three-dimensional shape data of the master workpiece W based on the pattern image data generated by the imaging unit 120. When "linkage" is selected in the measurement method selection area 701, the rotation mechanism 203 of the pedestal 200 is controlled, and illumination by the structured illumination unit 110 and imaging by the imaging unit 120 are executed similarly to the first sequence.

When the second sequence ends, the user places the master workpiece W in a third attitude illustrated in FIG. 3 on the stage 202, thereafter sets measurement conditions in the respective areas 701 to 707 of the measurement setting user interface screen 700, and then operates the measurement execution button 708. Then, the three-dimensional shape data generation apparatus 1 executes a third sequence.

In the third sequence, the imaging unit 120 generates a third alignment image in response to a measurement start instruction received by the reception unit 301*b*. Thereafter, similarly to the first sequence, pattern image data is generated, and three-dimensional shape data is generated. Similarly, a fourth sequence, a fifth sequence, . . . , and so on can be executed. Note that the measurement may be completed only with the first sequence.

When each sequence ends, the computing apparatus 301 stores a measurement condition set by the user, an alignment image generated by the imaging unit 120, and three-dimensional shape data in the storage unit 304. That is, the storage unit 304 stores a measurement file in which the measurement condition received by the reception unit 301*b*, the alignment image, and the three-dimensional shape data are associated with each other. More specifically, as illustrated as a data structure of the master workpiece in the first sequence in FIG. 8, First three-dimensional shape data A is acquired in the first sequence, First measurement condition A for acquiring First three-dimensional shape data A is set, and First alignment image A is acquired by capturing an image of the master workpiece W in the first attitude. A measurement file in which First three-dimensional shape data A of the master workpiece W, First measurement condition A, and First alignment image A are associated with each other is stored in the storage unit 304 as First measurement file A. First measurement condition A and First alignment image A are Measurement reproduction data A of the first sequence. Further, in a case where an imaging angle is included as a measurement condition, the storage unit 304 stores a measurement file including the imaging angle.

In the second sequence, second three-dimensional shape data is acquired and set under the second measurement condition for acquiring the second three-dimensional shape data, and the second alignment image is acquired by capturing an image of the master workpiece W in the second attitude. A measurement file in which the second three-dimensional shape data of the master workpiece W, the second measurement condition, and the second alignment image are associated with each other is stored in the storage unit 304 as a second measurement file. More specifically, as illustrated as the data structure of the master workpiece in the second sequence in FIG. 8, Second three-dimensional shape data B is acquired in the second sequence, Second measurement condition B for acquiring Second three-dimensional shape data B is set, and Second alignment image B is acquired by capturing an image of the master workpiece W in the second attitude. A measurement file in which Second three-dimensional shape data B of the master workpiece W, Second measurement condition B, and Second alignment image B are associated with each other is stored in the storage unit 304 as Second measurement file B. Second measurement condition B and Second alignment image B are Measurement reproduction data B of the second sequence. Note that the same applies to the third sequence, but the description thereof will be omitted.

Figure 4:
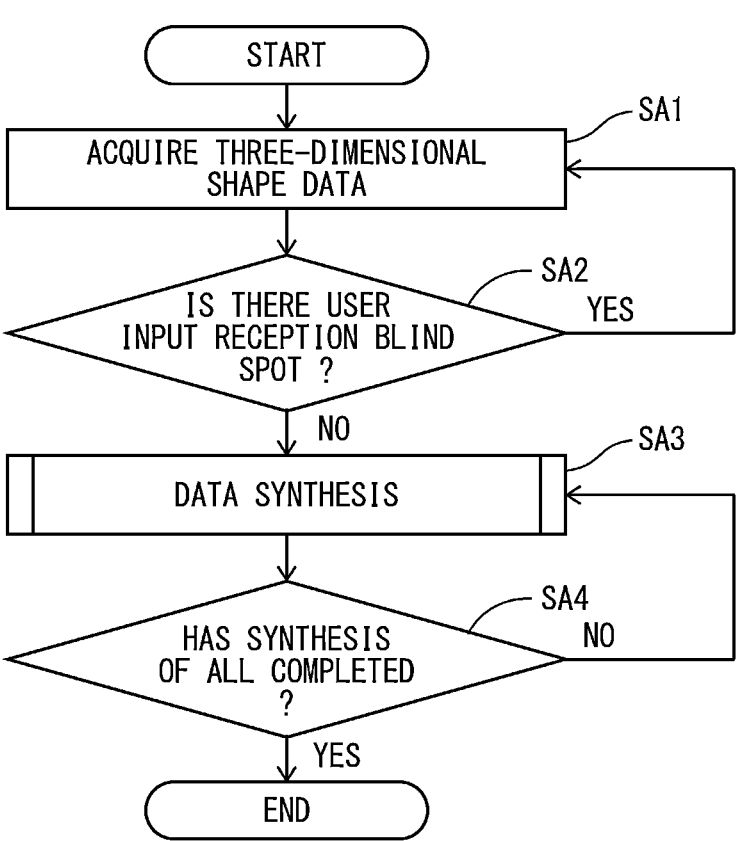
FIG. 4 is a flowchart illustrating an example of a procedure of initial measurement processing of the workpiece.

After acquiring the three-dimensional shape data in Step SA1 illustrated in FIG. 4, the display control unit 305 causes the display unit 400 to display the acquired three-dimensional shape data. As a result, the user can confirm the three-dimensional shape data. In Step SA2, the user's determination as to whether or not there is a blind spot in the three-dimensional shape data acquired in Step SA1 is received. If there is a blind spot, the flow returns to Step SA1, the master workpiece W is placed on the stage 202 again with an attitude changed from an attitude at the time of previous imaging, and Step SA1 is executed again. If the blind spot disappears by repeating this process a plurality of times, for example, the flow proceeds to Step SA3 to execute data synthesis processing.

Figure 6:
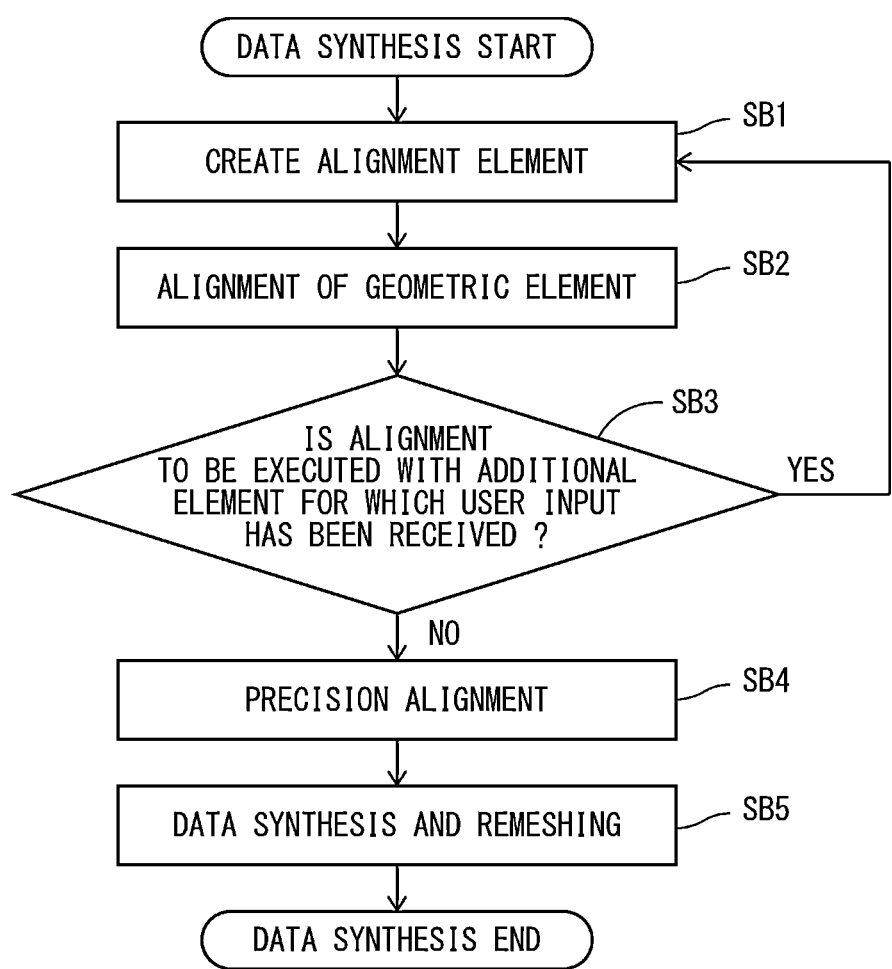
FIG. 6 is a flowchart illustrating an example of a data synthesis processing procedure.

Procedure of the data synthesis processing is illustrated in FIG. 6. In Step SB1, an alignment element is created based on a selection operation by the user. Specifically, the display control unit 305 causes the display unit 400 to display a data synthesis user interface screen 710 illustrated in FIG. 7. The data synthesis user interface screen 710 is provided with a first display area 711 in which a shape based on original three-dimensional shape data (for example, first three-dimensional shape data) is displayed, a second display area 712 in which a shape based on added three-dimensional shape data (for example, second three-dimensional shape data) is displayed, and a third display area 713 in which a shape based on synthetic three-dimensional shape data is displayed. Note that in the first to third display areas 711 to 713, the master workpieces W having shapes different from those of the master workpieces W illustrated in FIGS. 1 and 3 are displayed, but all the master workpieces W are examples, and the shapes thereof may be any shape.

Furthermore, the data synthesis user interface screen 710 is provided with a procedure display area 714 illustrating an alignment procedure and an element setting area 715 for setting an alignment element. In the element setting area 715, as illustrated in the first display area 711 and the second display area 712, the reception unit 301b receives designation of a geometric element such as a plane of "plane A" and "plane B" and a cylinder of "area C" based on an operation of the operation unit 500 by the user. The set geometric element is used at the time of specifying alignment information, and is information generated by receiving designation of corresponding surfaces between the first three-dimensional shape data of the master workpiece W and the second three-dimensional shape data of the master workpiece W by the reception unit 301b. "Plane A", "Plane B", and "area C" of the first display area 711 are surfaces corresponding to "Plane A", "Plane B", and "area C" of the second display area 712, respectively. Note that a type of the geometric element is not limited to a plane or a cylinder. Further, the alignment information only needs to include information of at least one geometric element, and only needs to be capable of designating at least one geometric element in each of the first display area 711 and the second display area 712. Note that a relative positional relationship between pieces of three-dimensional shape data when alignment is performed between shapes of the workpieces W may be used as the alignment information without using the information of the geometric element. This is the processing content of Step SB1.

In Step SB2, the synthesis unit 301c executes alignment of the geometric element created in Step SB1. That is, the synthesis unit 301c specifies the alignment information for aligning the first three-dimensional shape data of the master workpiece W acquired in the first sequence and the second three-dimensional shape data of the master workpiece W acquired in the second sequence. For example, when the first three-dimensional shape data is data of the front side of the master workpiece W and the second three-dimensional shape data is data of the back side of the master workpiece W, the front side and the back side can be aligned.

As an example of specifying of the alignment information, the synthesis unit 301c calculates a transformation matrix for aligning a position and an attitude of the first three-dimensional shape data of the master workpiece W with a position and an attitude of the second three-dimensional shape data of the master workpiece W based on designation of corresponding surfaces between the first three-dimensional shape data of the master workpiece W and the second three-dimensional shape data of the master workpiece W received by the reception unit 301b. Then, the synthesis unit 301c can specify the calculated transformation matrix as the alignment information.

After specifying the alignment information, the synthesis unit 301c synthesizes the first three-dimensional shape data of the master workpiece W and the second three-dimensional shape data of the master workpiece W based on the specified alignment information to generate the synthetic three-dimensional shape data of the master workpiece W.

Thereafter, the flow proceeds to Step SB3, and a user input as to whether or not to execute alignment with an additional element is received. In a case where the alignment with an additional element is executed, the flow returns to Step SB1 to add a geometric element, and then, proceeds to Step SB2. When proceeding to Step SB4, the original three-dimensional shape data and three-dimensional shape data to be added are precisely aligned. Thereafter, in Step SB5, a process of synthesizing the original three-dimensional shape data and the three-dimensional shape data to be added is executed to obtain remesh data.

When Step SB5 is finished, the flow proceeds to Step SA4 illustrated in FIG. 4 to determine whether or not synthesis of all pieces of three-dimensional shape data has been completed. The flow returns to Step SA3 to execute data synthesis processing if the synthesis of all pieces of three-dimensional shape data has not been completed, or ends if the synthesis of all pieces of three-dimensional shape data has been completed.

The computing apparatus 301 also stores the alignment information and the synthetic three-dimensional shape data in the storage unit 304. When these are stored, the storage unit 304 stores a synthetic data file in which the first measurement file, the second measurement file, the alignment information, and the synthetic three-dimensional shape data of the master workpiece W are associated with each other.

Figure 8:
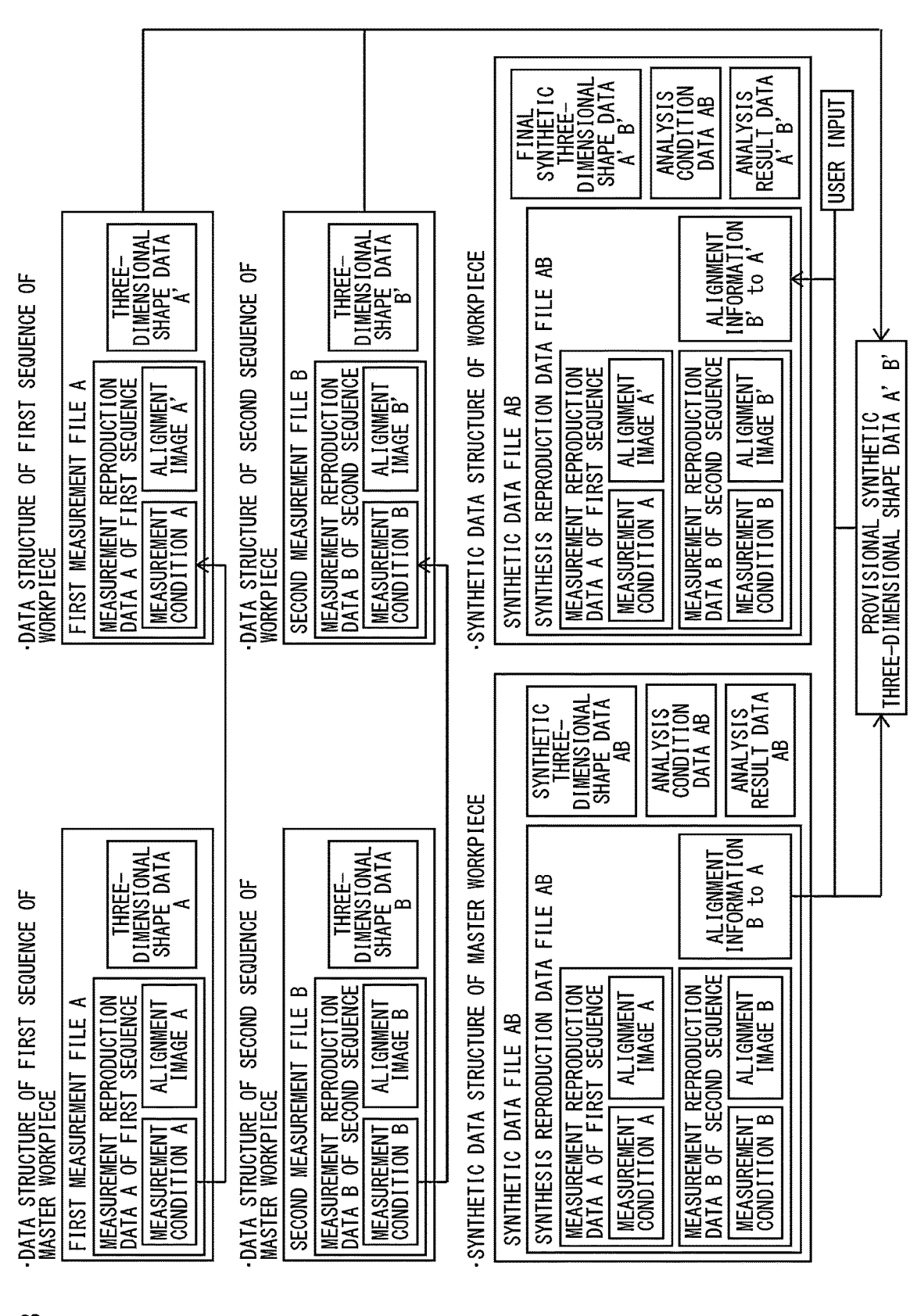
FIG. 8 is a view illustrating a data structure.

More specifically, as illustrated as a synthetic data structure of the master workpiece in FIG. 8, Synthetic data file AB is associated with Synthesis reproduction data file AB and Synthetic three-dimensional shape data AB. In Synthesis reproduction data file AB, Measurement reproduction data A of the first sequence, Measurement reproduction data B of the second sequence, and the alignment information for aligning Second three-dimensional shape data B with First three-dimensional shape data A are associated with each other. The storage unit 304 can store a plurality of synthetic data files.

The synthetic data file may be further associated with an analysis condition. The analysis condition is a condition used at the time of extracting a plurality of geometric elements from generated synthetic three-dimensional shape data and measuring dimensions between the plurality of extracted geometric elements, and a condition used at the time of measuring a tolerance. This analysis condition can also be included in the synthetic data file and stored in the storage unit 304.

(Measurement Reproduction)

Figure 9:
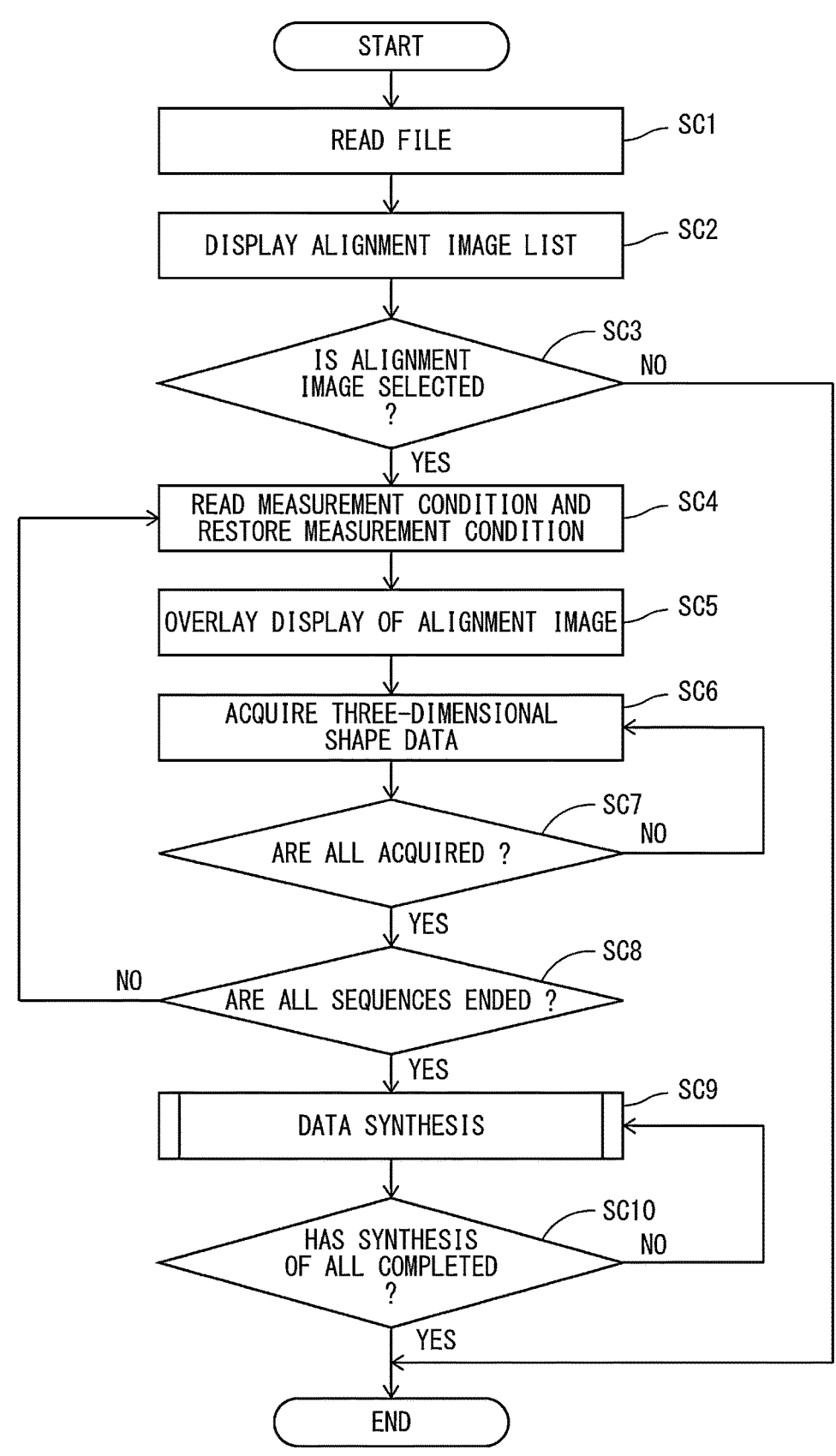
FIG. 9 is a flowchart illustrating an example of a procedure of processing in measurement reproduction.
Figure 10:
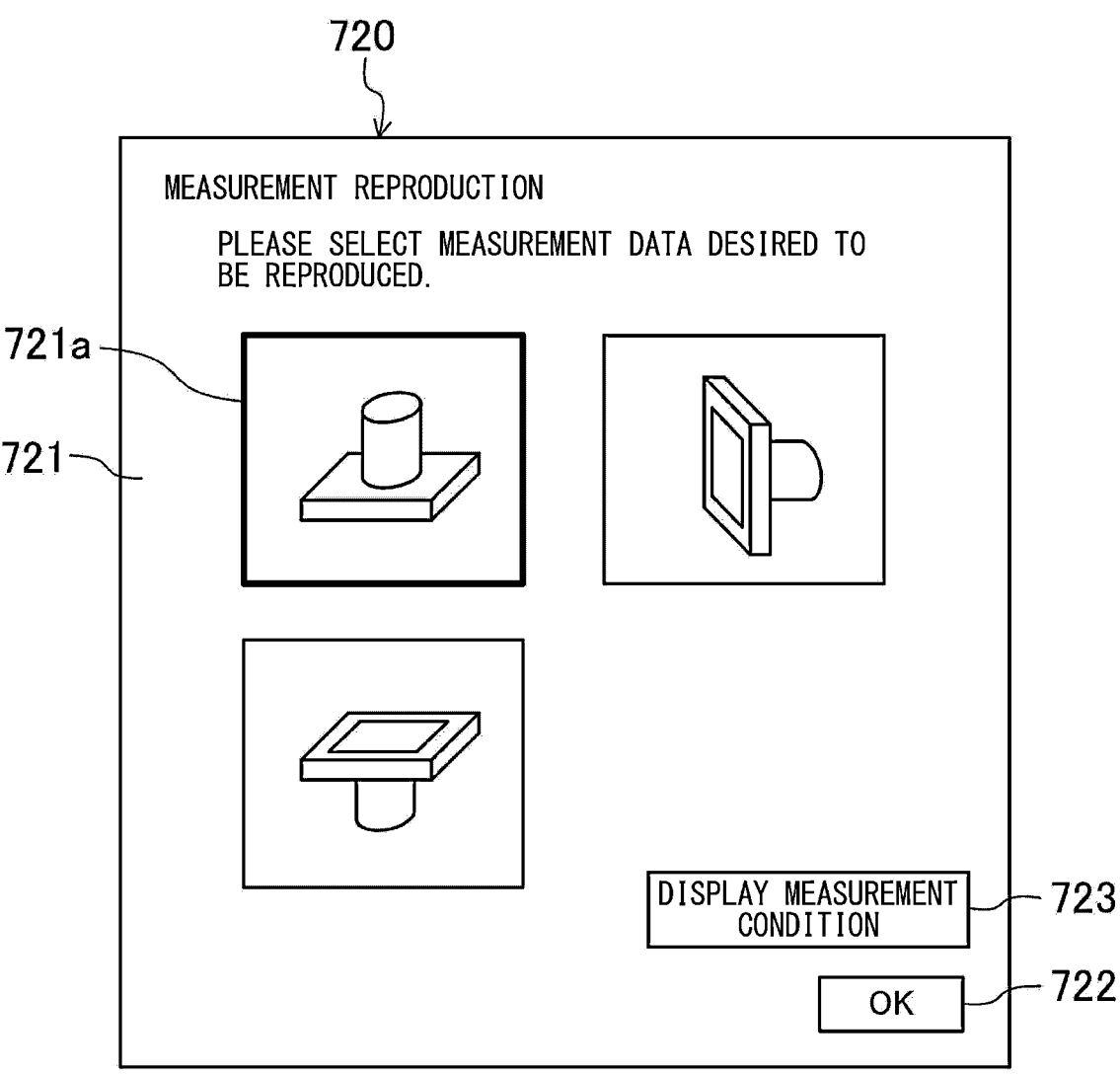
FIG. 10 is a view illustrating an example of a data selection user interface screen.

Next, a procedure of measuring the master workpiece W and then measuring the workpiece W having the same shape to generate synthetic three-dimensional shape data of the workpiece W will be described. In Step SC1 illustrated in FIG. 9, selection of one synthetic data file from a plurality of synthetic data files stored in the storage unit 304 is received, and the received synthetic data file is read. In Step SC2, an alignment image included in the synthetic data file read in Step SC1 is displayed on the display unit 400. Specifically, the display control unit 305 causes the display unit 400 to display a data selection user interface screen 720 as illustrated in FIG. 10. The data selection user interface screen 720 is provided with an alignment image display area 721 in which the alignment image included in the synthetic data file is displayed. In this example, information indicating a measurement file included in one synthetic data file read in Step SC1 is displayed on the display unit 400. Information indicating the measurement file is, for example, the alignment image, and the display unit 400 can be caused to display the alignment image associated with the first measurement file as information indicating the first measurement file and the alignment image associated with the second measurement file as information indicating the second measurement file. In the example illustrated in FIG. 10, three alignment images included in three measurement files are displayed in the alignment image display area 721 as pieces of information respectively indicating the three measurement files associated with one synthetic data file. Note that the number of alignment images displayed in the alignment image display area 721 is not particularly limited. The alignment image displayed in the alignment image display area 721 can be a thumbnail image smaller than an image actually captured by the imaging unit 120.

A case where one synthetic data file is selected and the alignment image included in the one synthetic data file is displayed has been described in the description of Steps SC1 and SC2. However, in a case where there is no synthetic data file, Step SC1 may be omitted, and a plurality of alignment images stored in the storage unit 304 may be displayed in the alignment image display area 721 in Step SC2. In Step SC3, it is determined whether or not one alignment image has been selected from the alignment images displayed in the alignment image display area 721. This selection operation can be performed by the user operating the operation unit 500, and the example illustrated in FIG. 10 illustrates a case where an upper left alignment image has been selected, and a selection frame 721a indicating which image has been selected is displayed. When an OK button 722 is operated by the user, a synthetic data file including the alignment image surrounded by the selection frame 721a is selected. Therefore, the alignment image selection operation is an operation of selecting one measurement file from a plurality of measurement files stored in the storage unit 304 and associated with one synthetic data file, which has been read in Step SC1, and this selection operation is received by the reception unit 301b.

Figure 11:
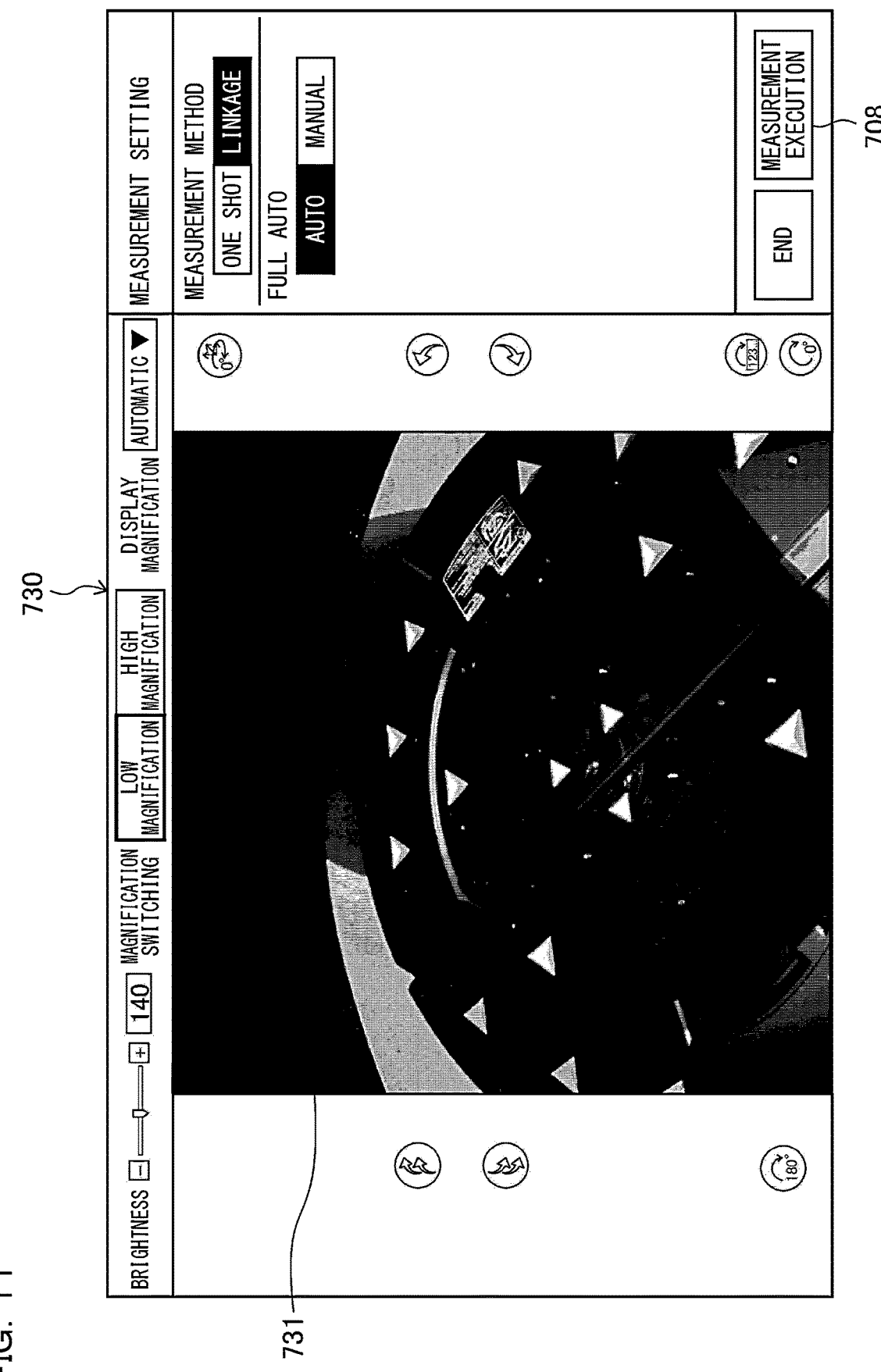
FIG. 11 is a view illustrating an example of a measurement user interface screen.

In Step SC4, the first measurement condition included in the measurement file selected in Step SC3 is read from the storage unit 304, and the read first measurement condition is restored, that is, applied. The user may change the applied measurement condition. In Step SC5, the display control unit 305 causes the display unit 400 to display the alignment image included in the synthetic data file selected in Step SC3 and associated with the first measurement file, and a live image of the workpiece W on the stage 202. FIG. 11 illustrates a measurement user interface screen 730 displayed on the display unit 400 by the display control unit 305. The measurement user interface screen 730 is provided with a live image display area 731 in which the live image currently captured by the imaging unit 120 is displayed. At this stage, the workpiece W is not placed on the stage 202, and thus, only the stage 202 is displayed in the live image display area 731 of FIG. 11.

Figure 12:
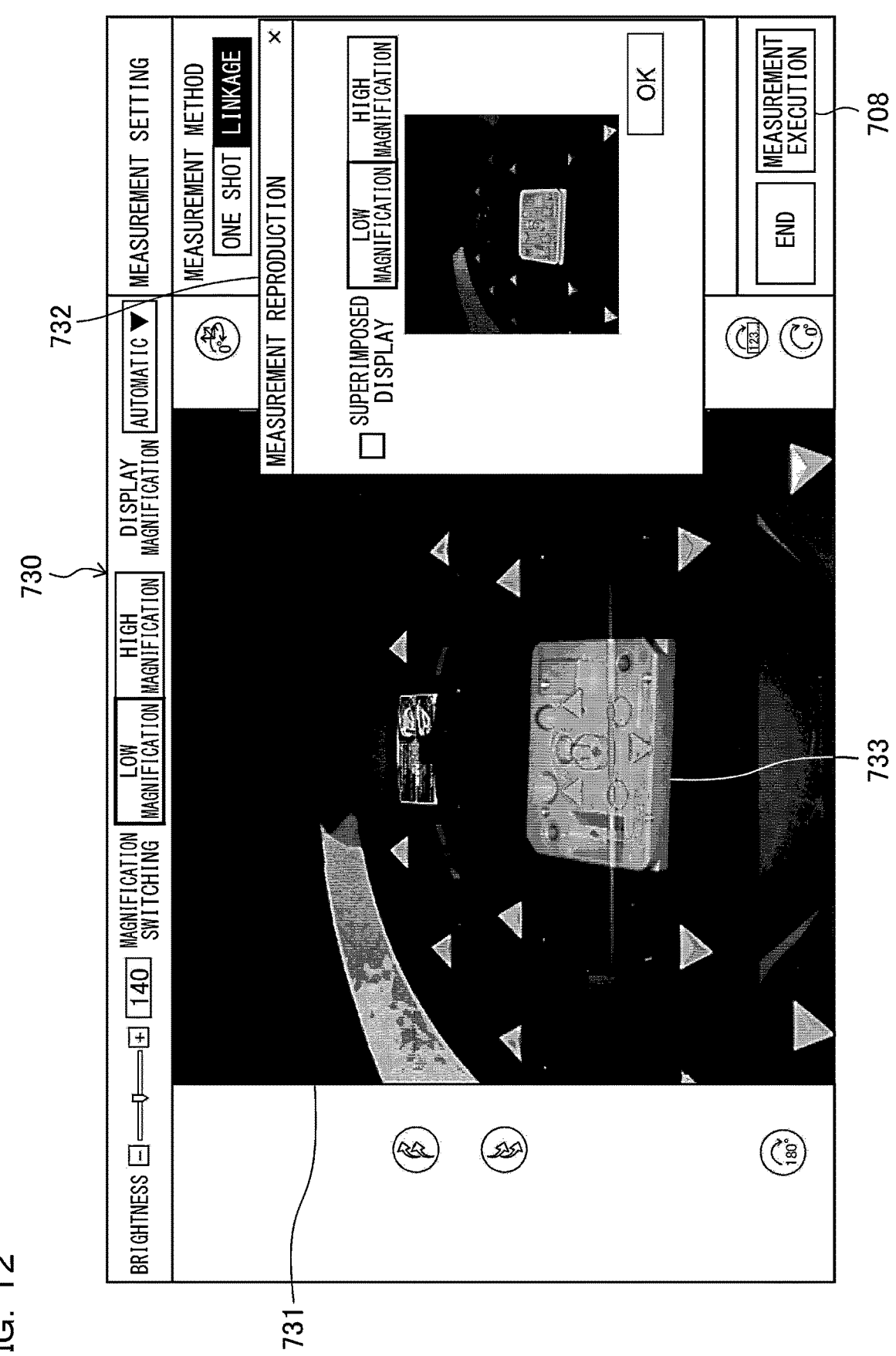
FIG. 12 is a view corresponding to FIG. 11 in which overlay display of an alignment image is performed.

FIG. 12 illustrates an example in which overlay display (superimposed display) of an alignment image 733 is performed in the live image display area 731 of the measurement user interface screen 730. The alignment image 733 is a guide image for aligning the workpiece W before being captured by the imaging unit 120 with a position (predetermined position) where the master workpiece W has been captured. A predetermined transmittance is set to the alignment image 733 such that the live image is displayed through the alignment image 733. The transmittance only needs to be the degree that enables the stage 202 and the workpiece W to be visually recognized through the alignment image 733.

On the measurement user interface screen 730, a measurement reproduction window 732 is also displayed in a state where the alignment image 733 is displayed. In the measurement reproduction window 732, an instruction to the user is displayed so as to overlap the actual workpiece W on the superimposed and displayed workpiece image, that is, the alignment image 733.

The user adjusts a position and an attitude of the workpiece W so as to overlap the alignment image 733 while viewing the alignment image 733. Further, the user adjusts a position and an attitude of the measurement unit 100 so as to overlap the alignment image 733 while viewing the alignment image 733. At this time, a moving direction may be converted such that the moving direction of the workpiece W on the stage 202 by the user and a moving direction of the workpiece W on the live image displayed on the display unit 400 are the same direction. Whether or not to convert the moving direction can be set by the user.

The measurement user interface screen 730 is provided with the measurement execution button 708 as in FIG. 5. When the alignment of the workpiece W is completed, the user operates the measurement execution button 708. When the user operates the measurement execution button 708, this operation is received by the reception unit 301b as the first measurement start instruction for the workpiece W currently placed on the stage 202.

When the first measurement start instruction is received, the flow proceeds to Step SC6. In Step SC6, the measurement control unit 130 specifies First measurement condition A associated with First measurement file A illustrated in FIG. 8 in response to the first measurement start instruction of the workpiece W, and controls the structured illumination unit 110 and the imaging unit 120 based on the specified First measurement condition A to generate first pattern image data. The three-dimensional shape data generation unit 301a controls the structured illumination unit 110 and the imaging unit 120 based on First measurement condition A specified by the measurement control unit 130, and generates First three-dimensional shape data A' of the workpiece W based on the pattern image data generated by the imaging unit 120. Further, at this time, the imaging unit 120 captures an image of the workpiece W on the stage 202 to generate First alignment image A. First measurement condition A, First three-dimensional shape data A, and First alignment image A are stored in the storage unit 304 in association with each other.

The flow proceeds to Step SC7 after Step SC6 to determine whether or not all pieces of three-dimensional shape data have been acquired. Note that, here, a state in which "all pieces of three-dimensional shape data have been acquired" is a state in which acquisition of three-dimensional shape data has been completed at all of set angular positions in a case where the setting of rotational linkage is included in a measurement condition, and this step may be omitted in a case where the setting of rotational linkage is not included in the measurement condition. The flow returns to Step SC6 in a case where not all the pieces of three-dimensional shape data have been acquired, or proceeds to Step SC8 in a case where all the pieces of three-dimensional shape data have been acquired. In Step SC8, it is determined whether or not all sequences have ended. When the first sequence ends in a case where the second sequence remains, the flow returns to Step SC4, the second measurement condition included in the synthetic data file selected in Step SC3 is read from the storage unit 304, and the read second measurement condition is restored, that is, applied.

In Step SC5, the alignment image associated with the second measurement file and a live image of the workpiece W on the stage 202 are displayed in the live image display area 731 of the measurement user interface screen 730 illustrated in FIG. 12.

When the user operates the measurement execution button 708 on the measurement user interface screen 730, this operation is received by the reception unit 301*b* as the second measurement start instruction for the workpiece W currently placed on the stage 202. When the second measurement start instruction is received, the flow proceeds to Step SC6. In Step SC6, the measurement control unit 130 specifies Second measurement condition B associated with Second measurement file B illustrated in FIG. 8 in response to the second measurement start instruction of the workpiece W, and controls the structured illumination unit 110 and the imaging unit 120 based on the specified Second measurement condition B to generate second pattern image data. The three-dimensional shape data generation unit 301*a* controls the structured illumination unit 110 and the imaging unit 120 based on Second measurement condition B specified by the measurement control unit 130, and generates Second three-dimensional shape data B' of the workpiece W based on the pattern image data generated by the imaging unit 120. Further, at this time, the imaging unit 120 captures an image of the workpiece W on the stage 202 to generate Second alignment image B'. Second measurement condition B, Second three-dimensional shape data B', and Second alignment image B' are stored in the storage unit 304 in association with each other.

When all the sequences end as described above, the flow proceeds to Step SC9 to execute data synthesis processing. Note that measurement reproduction is not necessarily executed for all the sequences. For example, measurement reproduction using an alignment image may be executed for only one of the first sequence and the second sequence, and normal measurement without using an alignment image may be executed for the other. For example, it is also possible to execute normal measurement without using an alignment image for the front side of the workpiece W and to execute measurement reproduction using an alignment image for the back side of the workpiece W.

Figure 14:
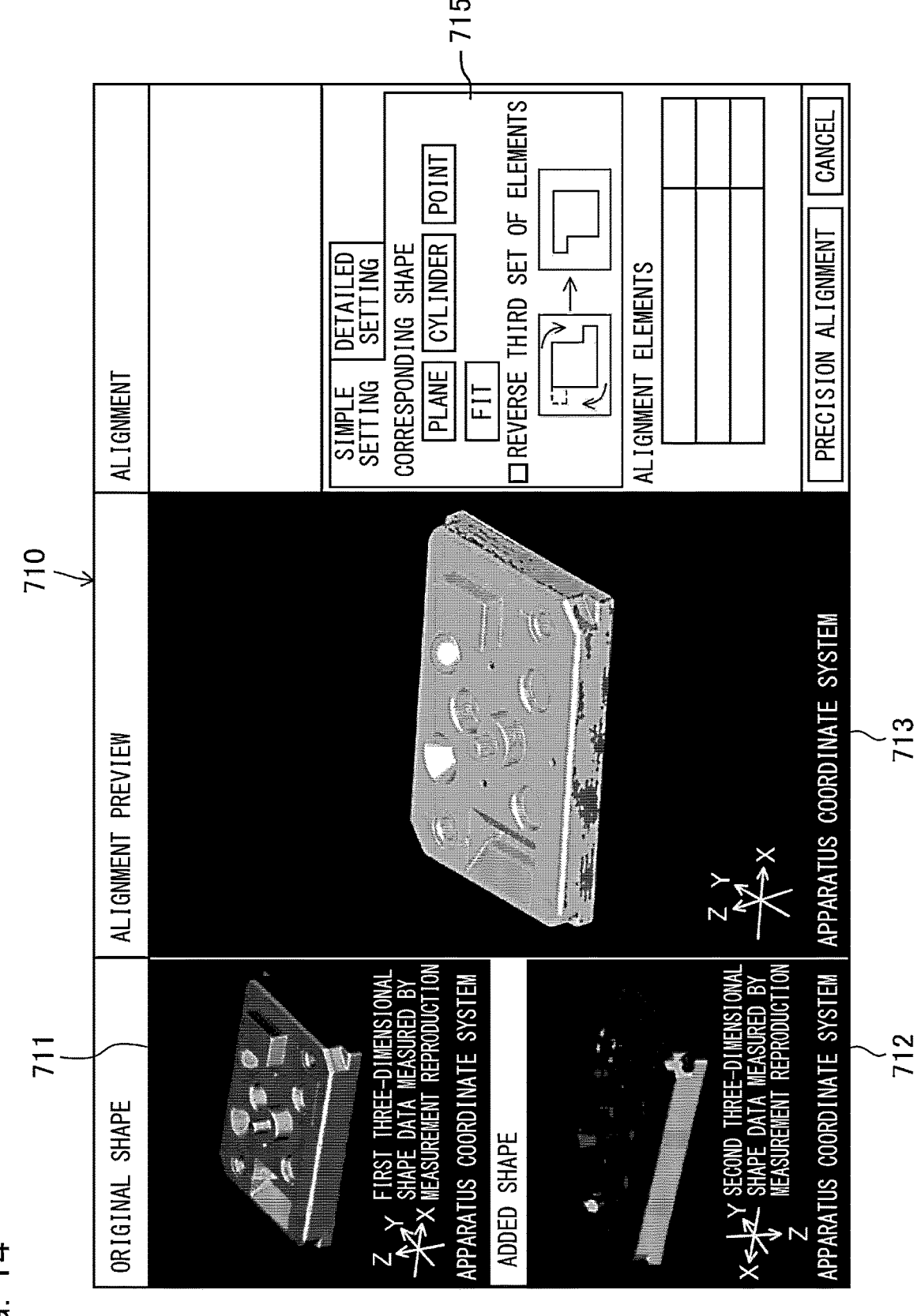
FIG. 14 is a view corresponding to FIG. 7 in the measurement reproduction.

A procedure of the data synthesis processing is illustrated in FIG. 13. In Step SD1, an initial attitude is reproduced. That is, the synthesis unit 301*c* reads a transformation matrix as alignment information calculated at the time of measuring the master workpiece W from a synthetic data file and restores the transformation matrix. FIG. 14 illustrates the data synthesis user interface screen 710 in the measurement reproduction. The first three-dimensional shape data measured by the measurement reproduction is displayed in the first display area 711, and the second three-dimensional shape data measured by the measurement reproduction is displayed in the second display area 712. The synthesis unit 301*c* reads a transformation matrix included in one synthetic data file, and automatically aligns the first three-dimensional shape data of the workpiece W and the second three-dimensional shape data of the workpiece W based on the read transformation matrix to generate synthetic three-dimensional shape data. That is, the synthesis unit 301*c* transforms coordinates of at least one of the first three-dimensional shape data of the workpiece W or the second three-dimensional shape data of the workpiece W based on the transformation matrix to generate the synthetic three-dimensional shape data. The synthetic three-dimensional shape data, which is three-dimensional shape data after the alignment, is displayed in the third display area 713.

In Step SD2, a user input as to whether or not to perform alignment with an additional geometric element is received. In a case where alignment with an additional geometric element is not performed, the flow proceeds to Step SD3, and the synthesis unit 301*c* executes precision alignment. Thereafter, the flow proceeds to Step SD4, and the synthesis unit 301*c* executes synthesis processing of the first three-dimensional shape data and the second three-dimensional shape data to obtain remesh data, and updates the synthetic three-dimensional shape data generated in Step SD1.

Figure 7:
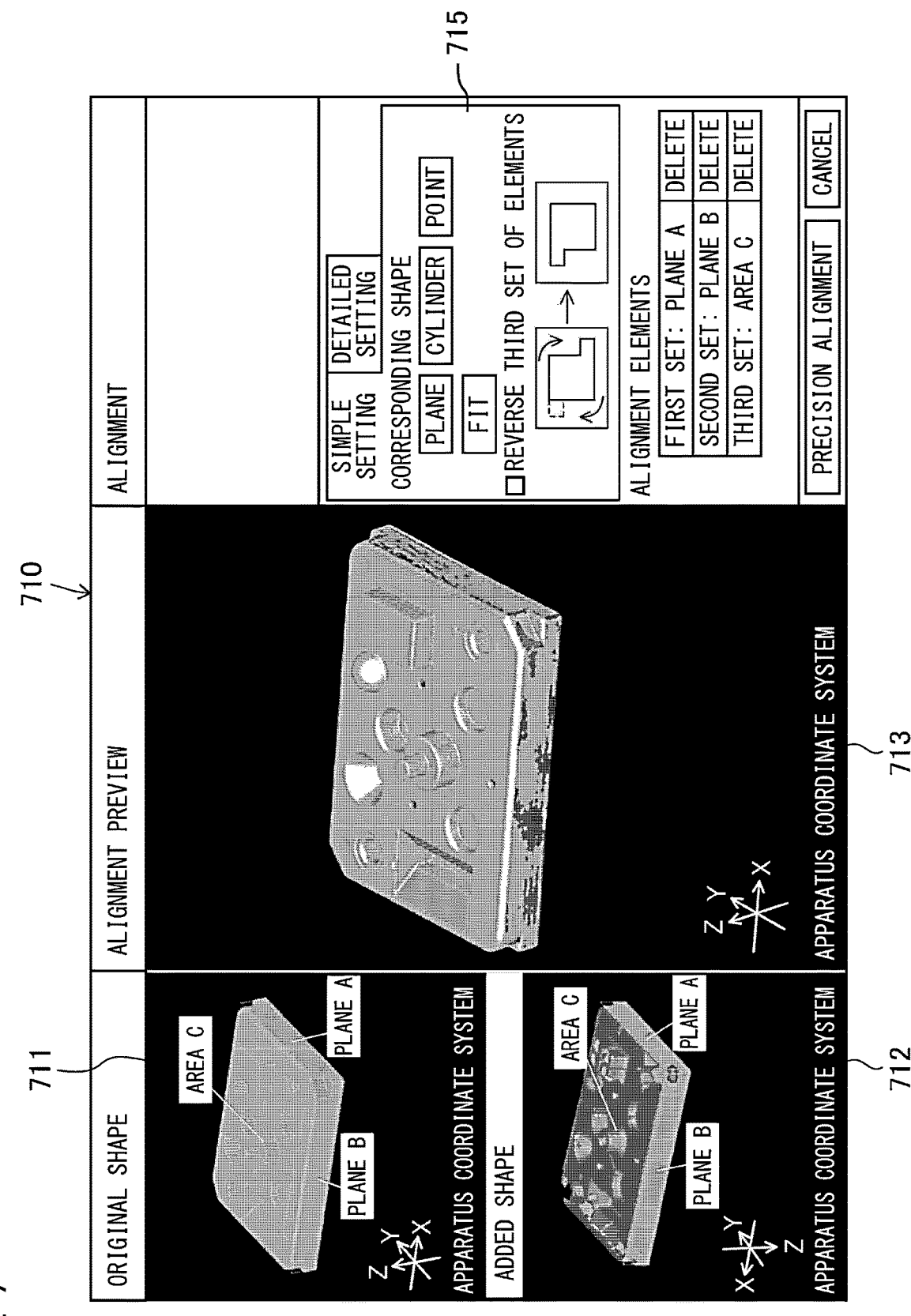
FIG. 7 is a view illustrating an example of a data synthesis user interface screen.

On the other hand, in a case where the flow proceeds to Step SD5, the user additionally creates an alignment element using the data synthesis user interface screen 710 and the like illustrated in FIG. 7. In Step SD6, the synthesis unit 301*c* executes alignment of the geometric element added in Step SD5, and updates the synthetic three-dimensional shape data generated in Step SD1. If it is not necessary to add an alignment element, the flow proceeds to Step SD3 described above.

As illustrated in FIG. 8, the synthetic data structure of the workpiece W includes First three-dimensional shape data A', Second three-dimensional shape data B', alignment information (information for aligning Second three-dimensional shape data B' with First three-dimensional shape data A'), and Final synthetic three-dimensional shape data A'B', and these are stored in the storage unit 304.

Although a case where the master workpiece is the workpiece in the initial measurement has been described in this example, the master workpiece is not necessarily the workpiece in the initial measurement. For example, when the workpiece W is measured for the third time, the workpiece W measured for the second time can be used as the master workpiece.

(Display of Measurement Condition)

It is also possible to select one piece of measurement data for displaying measurement conditions included in the measurement data using the data selection user interface screen 720 as illustrated in FIG. 10. A measurement condition display button 723 is displayed on the data selection user interface screen 720. When selection of one alignment image from a plurality of alignment images displayed in the alignment image display area 721 is received and an operation input of the measurement condition display button 723 is received by the operation unit 500, the display control unit 305 can cause the display unit 400 to display a measurement condition display user interface screen similar to the measurement setting user interface screen 700 illustrated in FIG. 5. In the measurement condition display user interface screen, the measurement execution button 708 may be omitted from the measurement setting user interface screen 700 illustrated in FIG. 5. As the measurement conditions are displayed on the display unit 400 in this manner, it is possible to confirm the measurement conditions under which the user has measured the workpiece W without performing actual measurement.

(Analysis Reproduction Using Analysis Condition)

As described with reference to FIG. 8, analysis condition data can be associated with the synthetic data file of the master workpiece. When an analysis condition associated with the synthetic data file of the master workpiece is applied to the synthetic three-dimensional shape data of the workpiece W generated in Step SD4, analysis of the master workpiece can be reproduced even with the workpiece W measured for the second or subsequent time. Specifically, an analysis unit 301d included in the computing apparatus 301 specifies the analysis condition data included in the synthetic data file of the master workpiece. Then, the analysis unit 301d specifies and analyzes an analysis target of the synthetic three-dimensional shape data of the workpiece W from the specified analysis condition data. When the analysis condition is a distance between Plane A and Plane B, the analysis unit 301d specifies planes respectively corresponding to Plane A and Plane B from the synthetic three-dimensional shape data of the workpiece W, and calculates a distance between the specified planes.

(Alignment Marker)

Figure 15:
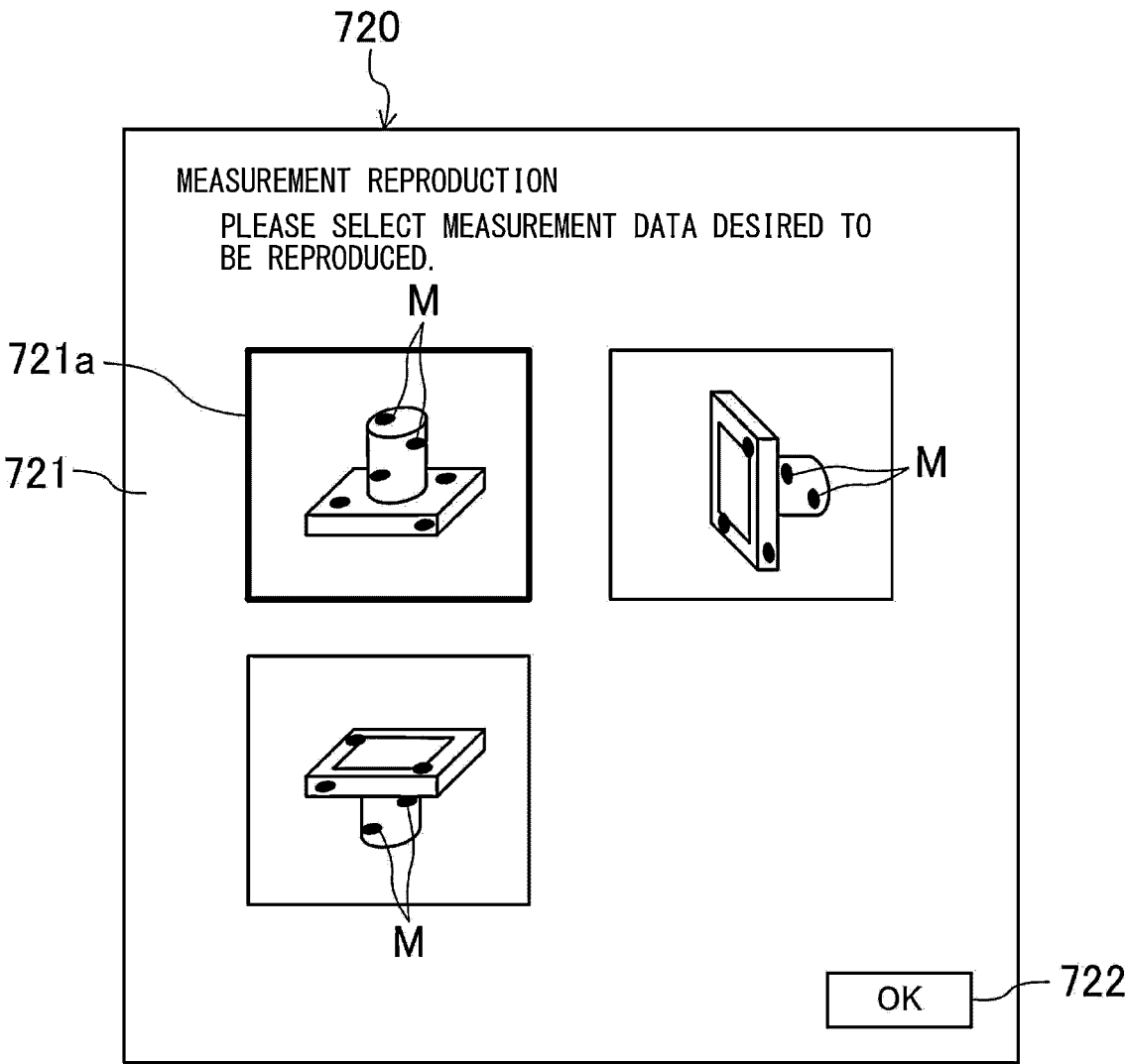
FIG. 15 is a view corresponding to FIG. 10 in a case where an alignment marker has been assigned.

FIG. 15 illustrates a case where alignment markers M have been assigned on the surface of the master workpiece W. The user assigns the alignment markers M to the surface of the master workpiece W, and thereafter the first sequence and the second sequence are executed for the master workpiece W as described above to generate first three-dimensional shape data and second three-dimensional shape data. The synthesis unit 301c matches a position and an attitude of the first three-dimensional shape data with a position and an attitude of the second three-dimensional shape data using the alignment markers M to generate synthetic three-dimensional shape data of the master workpiece W.

When the first three-dimensional shape data and the second three-dimensional shape data are aligned by the master workpiece W to which the alignment markers M have been assigned, a position and the attitude for each sequence can be reproduced based on the master workpiece W in the workpiece W at the time of measurement reproduction, so that the alignment marker M is unnecessary in the workpiece W at the time of measurement reproduction.

(Display Mode of Alignment Image and Alignment Method)

Although the alignment image is displayed on the display unit 400 as a transmission image in the above embodiment, a display mode of the alignment image is not limited thereto. For example, the alignment image is not necessarily the transmission image, and may be displayed as a bird's-eye view image on the display unit 400. Further, the alignment image may be projected on a screen (display unit). Further, the display unit 400 may be a head-mounted display. In this case, the alignment image of the workpiece W and the live image can be displayed on the head-mounted display in a state where the user wears the head-mounted display, and the alignment of the workpiece W can be performed while viewing the images.

Further, the user performs the alignment such that the workpiece W overlaps the alignment image in the above embodiment, but the invention is not limited thereto, and the alignment image and the live image may be displayed in different areas of the display unit 400, and the position and the attitude of the workpiece W may be adjusted such that the workpiece W is placed at the same position as the alignment image on the stage 202 while viewing the alignment image. Further, the position and the attitude of the workpiece W may be adjusted by holding the workpiece W using a six-degree-of-freedom arm.

A magnification of the imaging unit 120 may be different for each sequence. For example, even in a case where the first sequence has a high magnification and the second sequence has a low magnification, the synthesis unit 301c can perform data synthesis, and the user can align the workpiece W based on the alignment image.

(Automatic Alignment Function)

The three-dimensional shape data generation apparatus 1 may have an automatic alignment function. When the user aligns the workpiece W while viewing the alignment image, there is a case where it is difficult to place the workpiece W at a position completely matching with the alignment image. In particular, the alignment of the workpiece W is performed through transmission of the alignment image, an image is blurred if the workpiece W even slightly deviates from the alignment image. In this case, the computing apparatus 301 calculates the deviation between the alignment image and the workpiece image on the live image, and can control the movable stage 202 to automatically adjust a position of the workpiece W so as to eliminate the deviation.

Second Embodiment

Figure 16:
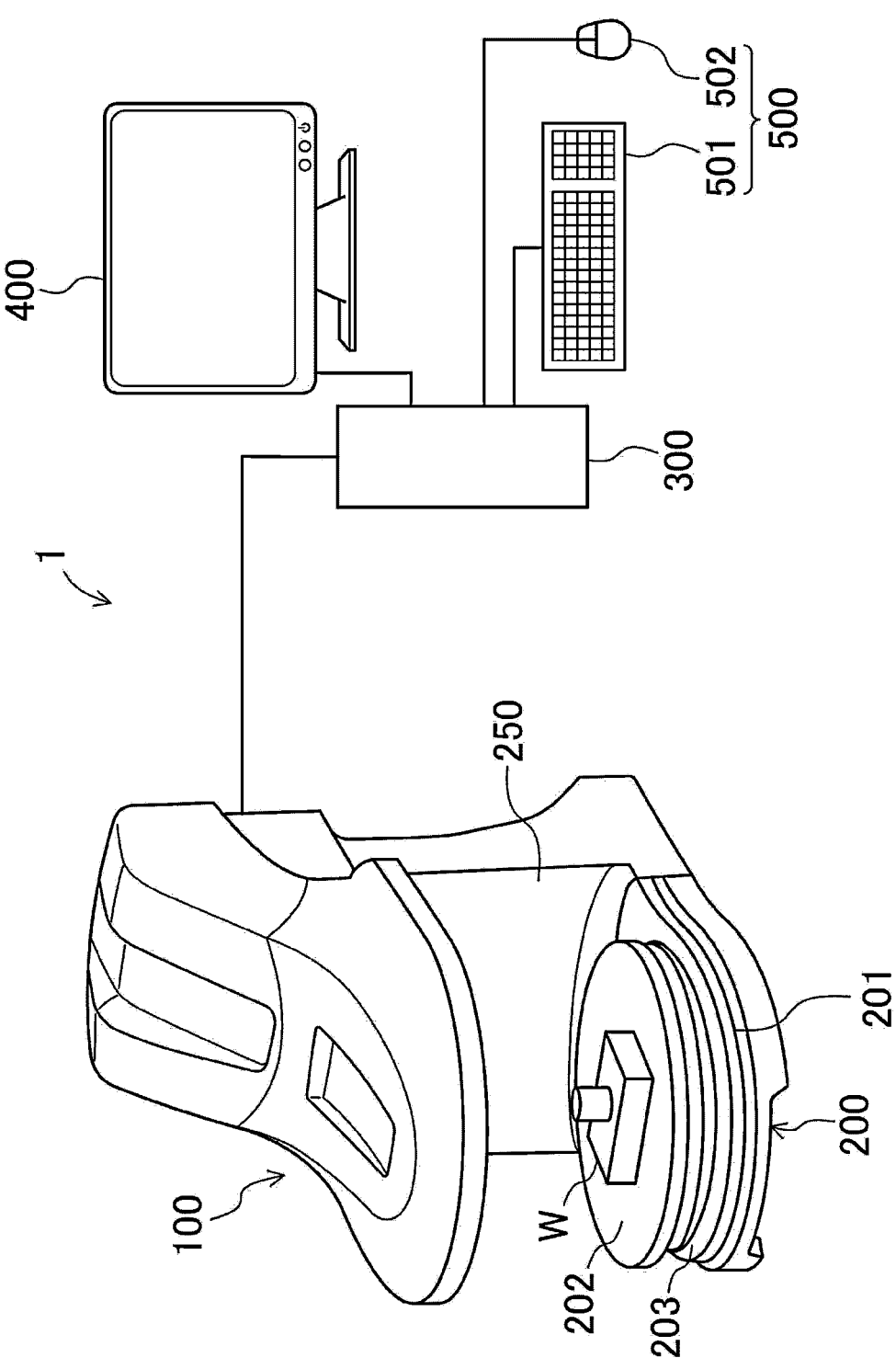
FIG. 16 is a diagram illustrating an overall configuration of a three-dimensional shape data generation apparatus according to a second embodiment of the invention.

FIG. 16 is a diagram illustrating an overall configuration of the three-dimensional shape data generation apparatus 1 according to a second embodiment of the invention. The three-dimensional shape data generation apparatus 1 according to the second embodiment is different from that of the first embodiment in that the measurement unit 100 and the pedestal 200 are integrated. Hereinafter, the same parts as those in the first embodiment will be denoted by the same reference signs and will not be described, and different parts will be described in detail.

That is, a support unit 250 that supports the measurement unit 100 is provided on the back side of the pedestal 200 so as to extend upward. The measurement unit 100 is fixed to an upper portion of the support unit 250. The measurement unit 100 is provided with the structured illumination unit 110 and the imaging unit 120 such that an optical axis is directed toward the stage 202.

The three-dimensional shape data generation apparatus 1 according to the second embodiment can also generate three-dimensional shape data similarly to the first embodiment.

The above-described embodiment is merely an example in all respects, and should not be construed as limiting. Further, all modifications and changes belonging to the equivalent range of the claims fall within the scope of the invention.

As described above, the three-dimensional shape data generation apparatus according to the disclosure can be used in the case of generating three-dimensional shape data of a workpiece.

What is claimed is:

1. A three-dimensional shape data generation apparatus comprising:

a structured illumination unit that irradiates a workpiece with structured light for measurement;

an imaging unit having an angle of view to receive the structured light emitted by the structured illumination unit and reflected by the workpiece and generate pattern image data of the workpiece;

a three-dimensional shape data generation unit that generates three-dimensional shape data of the workpiece based on the pattern image data generated by the imaging unit;

a storage unit that stores a plurality of measurement files in which each of measurement conditions of the workpiece is associated with each of alignment images for aligning a workpiece before being captured by the imaging unit at a predetermined position;

a display control unit that causes a display unit to display a live image of the workpiece and the alignment image associated with one measurement file from among the plurality of measurement files stored in the storage unit;

a reception unit that receives a measurement start instruction of the workpiece; and a measurement control unit that controls the structured illumination unit and the imaging unit based on the measurement condition associated with the one measurement file in response to the measurement start instruction received by the reception unit.

2. The three-dimensional shape data generation apparatus according to claim 1, wherein the reception unit receives a setting of a measurement condition of a master workpiece and the measurement start instruction, the imaging unit generates the alignment image in response to the measurement start instruction received by the reception unit, and the storage unit stores a measurement file in which the measurement condition received by the reception unit is associated with the alignment image generated by the imaging unit.

3. The three-dimensional shape data generation apparatus according to claim 2, wherein the reception unit receives a setting of a first measurement condition and a first measurement start instruction, the measurement control unit controls the structured illumination unit and the imaging unit based on the first measurement condition, the imaging unit generates a first alignment image in response to the first measurement start instruction received by the reception unit, and receives structured light reflected by the master workpiece to generate pattern image data, the three-dimensional shape data generation unit generates first three-dimensional shape data of the master workpiece based on the pattern image data generated by the imaging unit, the reception unit further receives a setting of a second measurement condition and a second measurement start instruction, the measurement control unit controls the structured illumination unit and the imaging unit based on the second measurement condition, the imaging unit generates a second alignment image in response to the second measurement start instruction received by the reception unit and receives structured light reflected by the master workpiece to generate pattern image data, and the three-dimensional shape data generation unit generates second three-dimensional shape data of the master workpiece based on the pattern image data generated by the imaging unit, and the storage unit stores:

a first measurement file in which the first three-dimensional shape data of the master workpiece, the first measurement condition, and the first alignment image are associated with each other; and a second measurement file in which the second three-dimensional shape data of the master workpiece, the second measurement condition, and the second alignment image are associated with each other.

4. The three-dimensional shape data generation apparatus according to claim 3, further comprising a synthesis unit that specifies alignment information for aligning the first three-dimensional shape data of the master workpiece and the second three-dimensional shape data of the master workpiece, and synthesizes the first three-dimensional shape data of the master workpiece and the second three-dimensional shape data of the master workpiece based on the specified alignment information to generate synthetic three-dimensional shape data of the master workpiece, wherein the storage unit stores a synthetic data file in which the first measurement file, the second measurement file, the alignment information, and the synthetic three-dimensional shape data of the master workpiece are associated with each other.

5. The three-dimensional shape data generation apparatus according to claim 4, wherein the reception unit receives selection of one synthetic data file from among a plurality of the synthetic data files stored in the storage unit, the display control unit causes the display unit to display the live image of the workpiece and an alignment image included in the one synthetic data file received by the reception unit and associated with the first measurement file, the reception unit receives a first measurement start instruction of the workpiece, the measurement control unit specifies a measurement condition associated with the first measurement file in response to the first measurement start instruction of the workpiece and controls the structured illumination unit and the imaging unit based on the specified measurement condition, the three-dimensional shape data generation unit controls the structured illumination unit and the imaging unit based on the measurement condition specified by the measurement control unit, and generates first three-dimensional shape data of the workpiece based on the pattern image data generated by the imaging unit, the display control unit causes the display unit to display the live image of the workpiece and an alignment image included in the one synthetic data file received by the reception unit and associated with the second measurement file, the reception unit receives a second measurement start instruction of the workpiece, the measurement control unit specifies a measurement condition associated with the second measurement file in response to the second measurement start instruction of the workpiece and controls the structured illumination unit and the imaging unit based on the specified measurement condition, the three-dimensional shape data generation unit controls the structured illumination unit and the imaging unit based on the measurement condition specified by the measurement control unit, and generates second three-dimensional shape data of the workpiece based on the pattern image data generated by the imaging unit, and the synthesis unit synthesizes the first three-dimensional shape data of the workpiece and the second three-dimensional shape data of the workpiece based on the alignment information included in the one synthetic data file to generate synthetic three-dimensional shape data of the workpiece.

6. The three-dimensional shape data generation apparatus according to claim 5, wherein the alignment information is generated as the reception unit receives designation of a corresponding surface between the first three-dimensional shape data of the master workpiece and the second three-dimensional shape data of the master workpiece.

7. The three-dimensional shape data generation apparatus according to claim 6, wherein the synthesis unit calculates a transformation matrix for aligning a position and an attitude of the first three-dimensional shape data of the master workpiece with a position and an attitude of the second three-dimensional shape data of the master workpiece based on the designation of the corresponding surface between the first three-dimensional shape data of the master workpiece and the second three-dimensional shape data of the master workpiece received by the reception unit, and specifies the calculated transformation matrix as the alignment information.

8. The three-dimensional shape data generation apparatus according to claim 5, wherein when the reception unit receives the selection of the one synthetic data file, the display control unit causes the display unit to display information indicating the first measurement file and information indicating the second measurement file included in the one synthetic data file, and the reception unit receives selection of one measurement file of the information indicating the first measurement file and the information indicating the second measurement file displayed on the display unit.

9. The three-dimensional shape data generation apparatus according to claim 8, wherein the information indicating the first measurement file is the alignment image associated with the first measurement file, and the information indicating the second measurement file is the alignment image associated with the second measurement file.

10. The three-dimensional shape data generation apparatus according to claim 2, wherein the reception unit receives at least one of a setting of a projection pattern of structured light emitted from the structured illumination unit or a setting of an exposure time of the imaging unit as the measurement condition.

11. The three-dimensional shape data generation apparatus according to claim 10, further comprising a rotation stage on which the master workpiece is placed, the rotation stage switching a relative positional relationship of the master workpiece with respect to the imaging unit, the reception unit receives designation of an imaging angle of the master workpiece relative to the imaging unit as the measurement condition associated with the one measurement file, the measurement control unit drives the rotation stage based on the imaging angle received by the reception unit, and the storage unit stores a measurement file including the imaging angle as the measurement condition.

12. The three-dimensional shape data generation apparatus according to claim 11, wherein the measurement control unit controls the rotation stage based on the imaging angle designated as the measurement condition associated with the one measurement file in response to the measurement start instruction received by the reception unit.

13. The three-dimensional shape data generation apparatus according to claim 1, wherein the display control unit causes the display unit to display a measurement condition display user interface screen displaying the measurement condition associated with the one measurement file.

14. The three-dimensional shape data generation apparatus according to claim 5, further comprising an analysis unit that is part of a computing apparatus that analyzes the synthetic three-dimensional shape data of the master workpiece, the synthetic data file is further associated with a master workpiece analysis condition, and wherein the analysis unit analyzes the synthetic three-dimensional shape data of the workpiece based on the master workpiece analysis condition associated with the synthetic data file.

* * * * *